(12) United States Patent
Fairchild et al.

(10) Patent No.: US 7,874,471 B2
(45) Date of Patent: Jan. 25, 2011

(54) BUTT WELD AND METHOD OF MAKING USING FUSION AND FRICTION STIR WELDING

(75) Inventors: Douglas Paul Fairchild, Sugar Land, TX (US); Steven Jeffrey Ford, Missouri City, TX (US); Amit Kumar, Houston, TX (US); Nathan Eugene Nissley, Houston, TX (US); Nicholas E. Biery, Westerville, OH (US); Mario L. Macia, Bellaire, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 12/653,743

(22) Filed: Dec. 17, 2009

(65) Prior Publication Data

US 2010/0159265 A1    Jun. 24, 2010

Related U.S. Application Data

(60) Provisional application No. 61/203,524, filed on Dec. 23, 2008.

(51) Int. Cl.
*B23K 20/12* (2006.01)
(52) U.S. Cl. .................................. 228/112.1; 428/544
(58) Field of Classification Search .................. None
See application file for complete search history.

(56) References Cited

U.S. PATENT DOCUMENTS 5,611,479 A    3/1997    Rosen
6,230,957 B1   5/2001    Arbegast et al.
6,259,052 B1   7/2001    Ding et al.

(Continued)

FOREIGN PATENT DOCUMENTS

JP    2001198677 A  *  7/2001

(Continued)

OTHER PUBLICATIONS

Co-pending commonly owned U.S. Appl. No. 12/590,956, filed Nov. 17, 2009.

*Primary Examiner*—Kiley Stoner
(74) *Attorney, Agent, or Firm*—Robert A. Migliorini

(57) ABSTRACT

Provided are butt welds and methods of making such butt welds using a combination of fusion root welding and friction stir welding to yield welds with decreased propensity for dropout during friction stir welding without the need for a back-up support plate. In one form of the present disclosure, the butt weld includes: two or more abutting structural steel components beveled on faying surfaces on one side of the components to form a suitably shaped fusion root weld groove and unbeveled on faying surfaces on the opposite side of the components and interconnected with a first fusion root weld on the beveled side of the components and a second friction stir weld on the unbeveled side of the components, wherein the first fusion root weld has a width ranging from 7 mm to 30 mm, a penetration depth ranging from 2 mm to 20 mm, and an overfill ranging from 2 mm to 5 mm, and wherein the stir zone of the second friction stir weld penetrates the first fusion root weld. The butt welds and methods of making find application in joining linepipe for oil and gas production.

83 Claims, 11 Drawing Sheets

U.S. PATENT DOCUMENTS

| | | | |
|---|---|---|---|
| 6,460,752 B1 * | 10/2002 | Waldron et al. | 228/112.1 |
| 6,715,664 B2 * | 4/2004 | Yamashita | 228/112.1 |
| 7,270,257 B2 | 9/2007 | Steel et al. | |
| 2002/0081149 A1 * | 6/2002 | Ezumi et al. | 403/270 |
| 2003/0098336 A1 * | 5/2003 | Yamashita | 228/112.1 |
| 2004/0020970 A1 * | 2/2004 | Palm | 228/112.1 |
| 2004/0040463 A1 * | 3/2004 | Yamamoto et al. | 105/396 |
| 2004/0239317 A1 * | 12/2004 | Goldfine et al. | 324/240 |
| 2006/0013645 A1 * | 1/2006 | Ilyushenko et al. | 403/270 |
| 2006/0081683 A1 | 4/2006 | Packer et al. | |
| 2006/0231588 A1 | 10/2006 | Sato et al. | |
| 2007/0175967 A1 | 8/2007 | Bangaru et al. | |
| 2007/0181647 A1 | 8/2007 | Ford et al. | |
| 2008/0032153 A1 | 2/2008 | Vaughn et al. | |
| 2008/0302539 A1 | 12/2008 | Mallenahalli et al. | |
| 2009/0068492 A1 * | 3/2009 | Fujii et al. | 428/615 |

FOREIGN PATENT DOCUMENTS

| | | | |
|---|---|---|---|
| JP | 2004009098 A | * | 1/2004 |
| JP | 2004223587 A | * | 8/2004 |
| JP | 2008-31494 | | 2/2008 |
| WO | WO2008/045631 | | 4/2008 |

* cited by examiner

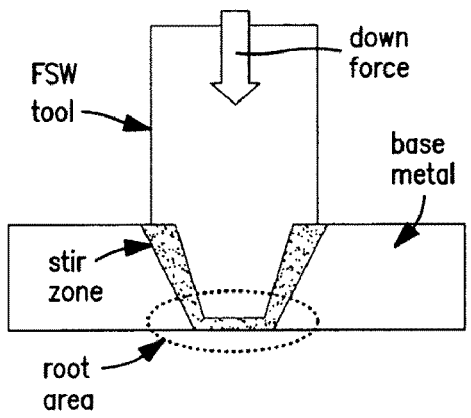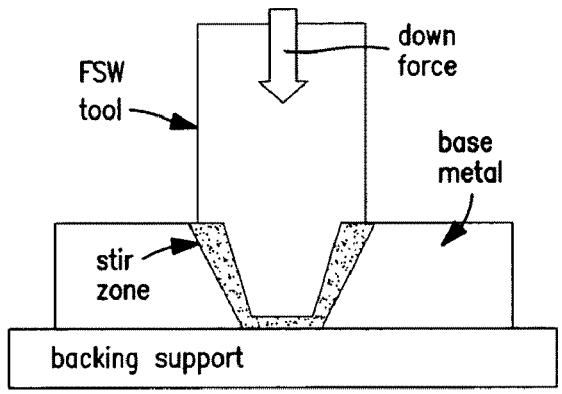
FIG. 6(a)  FIG. 6(b)

BUTT WELD AND METHOD OF MAKING USING FUSION AND FRICTION STIR WELDING

CROSS-REFERENCE TO RELATED APPLICATIONS

This is a non-provisional application that claims priority to U.S. Provisional Application No. 61/203,524 filed on Dec. 23, 2008, herein incorporated by reference in its entirety.

FIELD

The present disclosure relates generally to butt welds in steel structures. More specifically, the disclosure relates to butt welds in steel structures formed using a combination of fusion welding and friction stir welding methods.

BACKGROUND

The joining of metal parts such as formed shapes, forgings, castings, or plates to construct any number of structures or components for a variety of industries is largely performed by fusion welding. For example, construction using pipes and tubes to form pipelines for oil, gas and geothermal wells and the like is largely performed by conventional arc or fusion welding. For decades, the pipeline industry has made wide use of several fusion welding technologies such as shielded metal arc welding (SMAW) and mechanized gas metal arc welding (GMAW) for pipeline construction.

Arc or fusion welding involves melting of the materials being welded to create the joint. In such a process the larger the pipe diameter, or the thicker the wall of the pipe, the slower the welding becomes because a greater volume of metal must be melted and deposited in the weld joint. For onshore pipelines, particularly in remote areas, it is important that the welding be as economical as possible because of the large expense related to deployment of workers and equipment to the pipeline right of way (ROW). For offshore pipelines, it is important that the welding be as economical as possible because of the substantial costs associated with the laybarge. Several other factors such as availability of qualified welders, pipe thickness, welding productivity, quality of weld and automation of the welding process etc. may also play a role in the selection of welding process.

Girth welds of linepipe steels using the well established fusion welding processes typically consists of 3-20 passes of weld beads depending on the thickness of the pipe. Pipelines are built by girth welding individual joints of pipe together. During a standard pipeline construction process, mainline welding is accomplished by having about as many welding stations as there are number of weld passes, each station designed to produce one or two specific weld passes. The entire process, therefore, requires considerable manpower and associated expenses to house and support the workers, particularly in remote locations. The construction process is also time consuming, which impacts pipeline construction costs. Sometimes two pipes are first welded in a shop to create a "double joint" and then the double joints are transported to the pipeline right of way (ROW) for final field construction. In a typical field construction process, the pipe ends are butted together and then a welding process is used to fuse together the butted surfaces. Filler metal is also added to the weld as it is being made. Welding shacks are often used at each welding station to protect the external welding activity from the weather elements. Typically, each shack is devoted to applying one or two welding beads.

Friction Stir Welding (FSW) is a solid state joining technique that uses a rotating (spinning) tool to stir metal together to form a joint or weld. The spinning tool is pressed into the material being welding with considerable force. A downward force is applied perpendicular to the pieces being welded. A translational force(s) is applied roughly parallel to the surfaces of the pieces being welded, this force being used to translate the tool along the weld joint. If the weld joint consists of a curved path, there may also be transverse reaction forces to be supported by the FSW equipment. FSW is suitable for butt welding, but may be applied to other joint configurations. The heat generated during FSW softens the material adjacent to the tool and reduces its strength. This softening (which extends a few millimeters from the tool) is necessary to plasticize the material and allow it to be stirred. The softened area that becomes mechanically mixed is commonly referred to as the stir zone. Because the material in the stir zone is heated to a relatively high temperature during friction stir welding, it is weakened. This also includes the material in the root area, which is the area of material to be welded that is just below the tip of the spinning tool. Hence, during FSW, the root area is typically supported from beneath the work pieces such that the stir zone does not displace away the bottom of the weld joint. A backing support plate is often used to provide support to the stir zone during FSW. In the absence of a backing support to resist the down forces exerted during FSW, the material in the stir zone of the weld may displace away from the bottom of the weld joint resulting in a defective weld or joint.

It is desired to use FSW to join metallic components without the use of an independent backing support and to solve the problem of common root defects that can occur with the use of a backing support. More specifically, it is desired to use FSW without a backing support to construct oil and gas pipelines. FSW can join in a single pass the entire wall thickness, or nearly the entire wall thickness, of pipes which would require multiple arc welding passes. However, one of the problems in applying FSW for pipeline construction relates to the need for backing support and how to accommodate any practical means of backing support into the considerable "front end" activity that takes place when pipes are welded onto a newly constructed pipe string. At the front end of the construction process, workers are conducting such activities as pipe beveling and preheating, which may limit access to the inside of the pipe for use of an internal backing support to counter the FSW down force. Such an internal backing support would also be a bulky piece of equipment requiring some means of power and remote control, which would be difficult and costly. Additionally, the use of a backing support increases the likelihood of root defects because backing supports cannot easily accommodate the common problems of pipe misalignment, variations in pipe diameter, and variations in wall thickness. The use of a backing support for FSW during pipeline construction is problematic.

Hence there is a need for a butt weld and method of forming the butt weld using FSW that may be formed with a sufficiently strong root weld area such as to avoid the need for a backing support during FSW, whereby said butt weld and methods to form butt welds accomplish the goal of minimizing root defects in light of common geometric misalignments that occur in root areas when two workpieces are butted together.

DEFINITIONS

For convenience, various structural steel and welding terms used in this specification and claims are defined below.

Acceptable weldment strength: Strength level that is consistently above that of the base steel.

Acceptable weldment toughness: A toughness of greater than 0.05 mm, as measured by the crack-tip opening displacement (CTOD) test at less than or equal to 0° C.

HAZ: Heat-affected-zone.

Heat-affected-zone: Base metal that is adjacent to the weld line and that was affected by the heat of welding.

Toughness: Resistance to fracture.

Fatigue resistance: Resistance to fracture (crack initiation and propagation) under cyclic loading.

Yield strength: That strength corresponding to load support without permanent deformation.

FS: Friction stir.

FSW: Friction stir welding.

Friction stir welding: A solid state joining process for creating a welded joint between two work pieces in which the heat for joining the metal work pieces is generated by plunging a rotating tool between the work pieces and traversing the tool along the faying surfaces.

FSP: Friction stir processing.

Friction stir processing: The method of processing and conditioning the surface of a structure by pressing a FSW tool against the surface by partially plunging a pin into the structure.

Grain size: A measure of basic microstructural unit size where each unit possesses a significantly different crystallographic orientation and/or basic microstructure as compared to neighboring units. Grain size, as used herein, refers to the average grain size of a metal which can be measured by one of several techniques known to those skilled in the art of metallurgy. One such technique is described in ASTM E1382 or E112.

Weld joint: A welded joint including the fused or thermo-mechanically altered metal and the base metal in the "near vicinity" of, but beyond the fused metal. The portion of the base metal that is considered within the "near vicinity" of the fused metal varies depending on factors known to those skilled in the art of welding engineering.

Weldment: An assembly of component parts joined by welding.

Weldability: The feasibility of welding a particular metal or alloy. A number of factors affect weldability including chemistry, surface finish, heat-treating tendencies, the propensity of defect formation, and the like.

Carbon equivalent: A parameter used to define weldability of steels and expressed by the formula $CE=C+Mn/6+(Cr+Mo+V)/5+(Ni+Cu)/15$ where all units are in weight percent.

Pcm: A parameter used to define weldability of steels and expressed by the formula $Pcm=C+Si/30+(Mn+Cu+Cr)/20+Ni/60+Mo/15+V/10+5B$.

Hydrogen cracking: Cracking that occurs in the weld subsequent to welding and is caused by absorbed hydrogen, stresses such as residual stresses, and the presence of a susceptible microstructure like martensite.

TMAZ: Thermo-mechanically affected zone.

Thermo-mechanically affected zone: Region of a FSW joint that has experienced both temperature cycling and plastic deformation.

TMAZ-HZ: TMAZ-hard zone, the hardest region in a FSW weldment.

Dropout: A situation during FSW when due to inadequate support underneath the pieces being welded, the heated and softened material below the FSW tool displaces away from the weld joint. The deformed material leaves behind permanent geometrical change often appearing as a bulge rising from the material surface. The magnitude of dropout is defined by the distance between the position of the original workpiece surface and the furthest point of material expulsion. Excessive dropout can lead to the formation of weld defects.

Cross Weld Penetration: Refers to the situation where in a weld made from two sides of the workpiece (say, top and bottom), the first bead on the second side of the weld penetrates into the root bead of the first side of the weld. Achieving cross weld penetration ensures that the weld does not have an internal defect.

Duplex: Steel consisting of two phases, specifically austenite and ferrite.

Structural steel: Steel subjected to some type of mechanical load during use.

Martensite austenite constituent (MA): Remnant areas of microstructure in a ferritic steel or weld that transform on cooling to a mixture of martensite and retained austenite. These areas are often the last regions to transform on cooling. MA regions are stabilized due to carbon rejection from surrounding areas that have already transformed at higher temperatures. Due to stabilization, the transformation of austenite to MA occurs at lower temperatures than the surrounding areas. Regions of MA are typically dominated by martensite while only containing small volume fractions of retained austenite (less than 10%). MA is often seen on prior austenite grain boundaries of welds or HAZs that experience double thermal cycles. MA is also found on lath boundaries in the lath based microstructures of degenerate upper bainite and lower bainite. MA is typically observed on any number of lath, packet or grain boundaries present in structural steels.

Acicular ferrite (AF): AF is often the first decomposition product to transform in a steel weld from the austenite during cooling, although proeutectoid ferrite (polygonal ferrite) can sometimes form first. AF nucleates on small, non-metallic inclusions and then experiences rapid growth by a bainitic-type transformation mechanism. The AF grains typically exhibit a needle-like morphology with aspect ratios ranging from about 2:1 to 20:1 depending on cooling rate and chemistry. This transformation involves both shear and diffusional components. This transformation involves both shear and diffusional components. The transformation temperature controls the interplay between the diffusional and shear components, thus determining AF morphology.

Granular bainite (GB): Refers to a cluster of 3 to 5 relatively equiaxed bainitic ferrite grains that surround a centrally located, small "island" of Martensite-Austenite (MA). Typical "grain" diameters are about 1-2 µm.

Upper bainite (UB): Refers to a mixture of acicular or laths of bainitic ferrite interspersed with stringers or films of carbide phase such as cementite. Most common in steels with carbon contents higher than about 0.15 wt %.

Degenerate upper bainite (DUB): A bainitic product where each colony grows by shear stress into a set (packet) of parallel laths. During and immediately after lath growth, some carbon is rejected into the interlath austenite. Due to the relatively low carbon content, carbon enrichment of the entrapped austenite is not sufficient to trigger cementite plate nucleation. Such nucleation does occur in medium and higher carbon steels resulting in the formation of classical upper bainite (UB). The lower carbon enrichment at the interlath austenite in DUB, results in formation of martensite or martensite-austenite (MA) mixture or can be retained as retained austenite (RA). DUB can be confused with classical upper bainite (UB). UB of the type first identified in medium carbon steels decades ago consists of two key features; (1) sets of parallel laths that grow in packets, and (2) cementite films at the lath boundaries. UB is similar to DUB in that both contain packets of parallel laths; however, the key difference is in the interlath material. When the carbon content is about 0.15-0.40, cementite ($Fe_3C$) can form between the laths. These "films" can be relatively continuous as compared to the intermittent MA in DUB. For low carbon steels, interlath cementite does not form; rather the remaining austenite terminates as MA, martensite or RA.

Lower bainite (LB): LB has packets of parallel laths similar to DUB. LB also includes small, intra-lath carbide precipitates. These plate-like particles consistently precipitate on a single crystallographic variant that is oriented at approximately 55° from the primary lath growth direction (long dimension of the lath).

Lath martensite (LM): LM appears as packets of thin parallel laths. Lath width is typically less than about 0.5 µm. Untempered colonies of martensitic laths are characterized as carbide free, whereas auto-tempered LM displays intra-lath carbide precipitates. The intralath carbides in autotempered LM form on more than one crystallographic variant, such as on $\{110\}$ planes of martensite. Often the cementite is not aligned along one direction, rather it precipitates on multiple planes.

Tempered martensite (TM): TM refers to the heat treated form of martensite in steels whereby the heat treatment is performed in furnace or by local means such as using heating wrap. This form of tempering is conducted after welding fabrication. The microstructure and mechanical properties change as the metastable structure martensite incurs the precipitation of cementite during excursions in a temperature range where cementite precipitation is possible, but too low for austenite formation.

Auto-tempered lath martensite: martensite that incurs self-tempering during cooling from an operation such as welding. Cementite precipitation occurs in-situ, on cooling, and without reheating as is done for traditional tempering.

Pearlite: Typically a lamellar mixture of two-phases, made up of alternate layers of ferrite and cementite ($Fe_3C$). In low carbon structural steels, pearlite often appears in what is referred to as colonies meaning groupings of distinct pearlite areas that have common lamellae orientation.

Grain: An individual crystal in a polycrystalline material.

Grain boundary: Refers to a narrow zone in a metal corresponding to the transition from one crystallographic orientation to another, thus separating one grain from another.

Grain coarsening temperature differential: The temperature range between the A3 temperature and a temperature at which rapid grain growth occurs. The temperature at which rapid grain growth occurs depends on the steel's chemistry and microstructure and on the amount of time spent at high temperatures.

Prior austenite grain size: Refers to the average austenite grain size that existed before the steel component cools into the temperature range where lower temperature transformation products such as AF, GB, DUB, LB, or LM evolve.

SUMMARY

Provided are butt welds including structural steel components joined by a combination of a fusion root weld on one side of the components and a friction stir weld on the other side of the components. Also provided are methods of making such butt welds. It is to be understood that the fusion root weld is formed first in time and the friction stir weld is formed subsequent in time or second to the structural steel components. Hence the use of the terminology "first fusion root weld" and "second friction stir weld" throughout the specification and claims.

In one form of the current disclosure, an advantageous butt weld includes: two or more abutting structural steel components beveled on faying surfaces on one side of the components to form a suitably shaped fusion root weld groove and unbeveled on faying surfaces on the opposite side of the components and interconnected with a first fusion root weld on the beveled side of the components and a second friction stir weld on the unbeveled side of the components, wherein the first fusion root weld has a width ranging from 7 mm to 30 mm, a penetration depth ranging from 2 mm to 20 mm, and an overfill ranging from 2 mm to 5 mm, and wherein the stir zone of the second friction stir weld penetrates the first fusion root weld.

In another form of the current disclosure, an advantageous method of making a butt weld includes: providing two or more abutting structural steel components beveled on the faying surfaces of one side of the components to form a suitably shaped fusion root weld groove and unbeveled on the faying surfaces of the opposite side of the components, fusion welding the beveled faying surfaces of one side of the components under conditions sufficient to form a fusion root weld, wherein the fusion root weld has a width ranging from 7 mm to 30 mm, a penetration depth ranging from 2 mm to 20 mm, and an overfill ranging from 2 mm to 5 mm, and friction stir welding the unbeveled faying surfaces of the opposite side of the components under conditions sufficient to form a friction stir weld, wherein the stir zone of the friction stir weld penetrates the fusion root weld to make a continuous solid connection between the two welds, the penetration depth ranging from nearly zero millimeters to 5 mm.

In still yet another form of the current disclosure, an advantageous butt weld includes: two or more abutting structural steel components beveled on faying surfaces on one side of the components to form a suitably shaped fusion root weld groove and unbeveled on faying surfaces on the opposite side of the components and interconnected with a first fusion root weld on the beveled side of the components and a second friction stir weld on the unbeveled side of the components, wherein the first fusion root weld is of sufficient size and strength to support the down force applied in forming the second friction stir weld, and wherein the stir zone of the second friction stir weld penetrates the first fusion root weld to a sufficient depth to provide a continuously joined surface.

The current disclosure also includes a method of completing a friction stir butt weld that can be used to weld structural steel components such as plates, beams, pipes, pipelines or vessels without any means of backing support of mandrels. The fusion root weld in the current disclosure eliminates the need to use internal supporting systems such as mandrels or bladders. The structural components are held together by the root weld and the root weld provides the necessary support to react to the tool plunge force and the welding down force. This method may include the use of an orbital friction stir welding system.

These and other forms of the disclosed butt welds and methods of making the butt welds of the present disclosure and their advantageous applications and/or uses will be apparent from the detailed description which follows, particularly when read in conjunction with the figures appended hereto.

BRIEF DESCRIPTION OF THE DRAWINGS

To assist those of ordinary skill in the relevant art in making and using the subject matter hereof, reference is made to the appended drawings, wherein:

FIG. 6 depicts a schematic of the stir zone and root area during friction stir welding without a backing support plate (a) and with a backing support plate (b).

DETAILED DESCRIPTION

Figure 1:
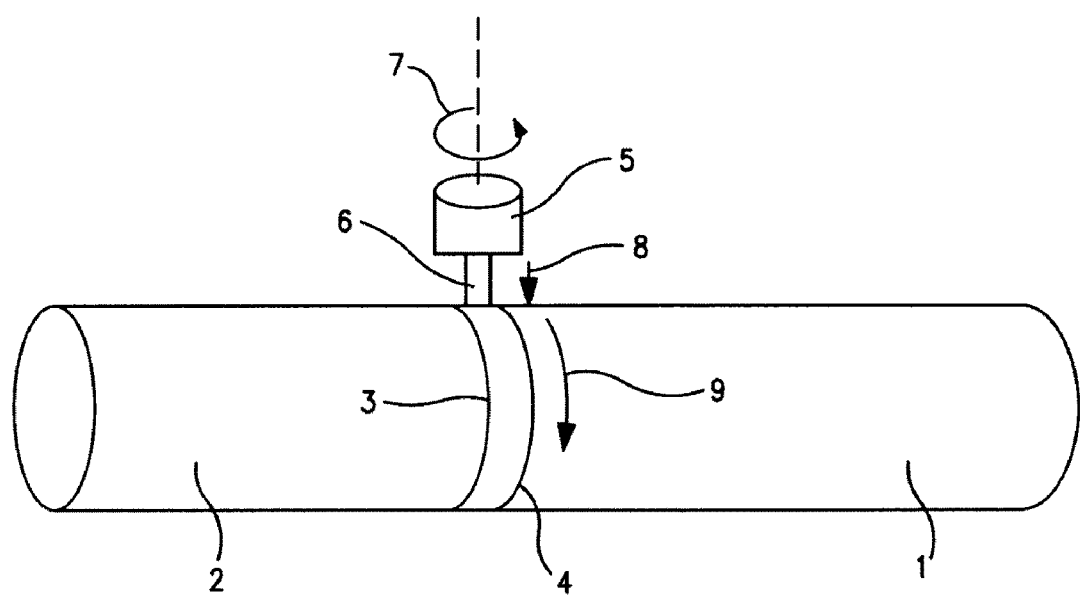
FIG. 1 is a schematic illustration of the method of joining two tubular structural steel components by friction stir welding.

All numerical values within the detailed description and the claims herein are modified by "about" or "approximately" the indicated value, and take into account experimental error and variations that would be expected by a person having ordinary skill in the art.

U.S. Patent Publication No. 20070175967, incorporated by reference herein in its entirety, discloses a method for welding and repairing cracks in metal parts is provided by subjecting the metal parts to be welded to friction stir welding and the cracks to be repaired to friction stir processing under conditions sufficient to provide a weld joint or crack repair having a preselected property or set of properties based upon the intended use of the weldment.

U.S. Patent Publication No. 20070181647, incorporated by reference herein in its entirety, discloses the use of friction stir processing and friction stir welding methods for joining and repairing metal structures and components in applications for natural gas transportation and storage, oil and gas well completion and production, and oil and gas refinery and chemical plants.

U.S. Patent Publication No. 20080032153, incorporated by reference herein in its entirety, discloses the use of friction stir and laser shock processing in oil & gas and/or petrochemical applications.

PCT Patent Publication No. WO2008/045631, incorporated by reference herein in its entirety, discloses a steel composition and method from making a dual phase steel therefrom. In one form, the dual phase steel comprises carbon in an amount of about 0.05% by weight to about 0.12 wt %; niobium in an amount of about 0.005 wt % to about 0.03 wt %; titanium in an amount of about 0.005 wt % to about 0.02 wt %; nitrogen in an amount of about 0.001 wt % to about 0.01 wt %; silicon in an amount of about 0.01 wt % to about 0.5 wt %; manganese in an amount of about 0.5 wt % to about 2.0 wt %; and a total of molybdenum, chromium, vanadium and copper less than about 0.15 wt %. The steel has a first phase consisting of ferrite and a second phase comprising one or more constituents selected from the group consisting of carbide, pearlite, martensite, lower bainite, granular bainite, upper bainite, and degenerate upper bainite.

Japanese Patent Publication No. JP2008-31494, incorporated by reference herein in its entirety, discloses low alloy structural steels with designed chemistry for an enlarged ferrite region and a mixed two phase (ferrite+austenite) region at temperatures above 600° C. or reduced austenite phase region in an equilibrium phase diagram formed by adding ferrite stabilizing elements such as Si (0.4%~4%), Al (0.3%~3%), Ti (0.3%~3%) and/or combination thereof.

U.S. Patent Application Ser. No. 61/199,557 filed on Nov. 18, 2008, incorporated by reference herein in its entirety, discloses steel structures and methods of making such steel structures that include structural steel components bonded by friction stir weldments with advantageous microstructures to yield improved weldment strength and weldment toughness.

U.S. Pat. No. 6,259,052, incorporated by reference herein in its entirety, discloses an orbital friction stir weld system that provides a back side weld support.

U.S. Pat. No. 7,270,257, incorporated by reference herein in its entirety, also discloses an orbital friction stir weld system that utilizes and internal mandrel to support the inside of the pipe.

Overview:

Provided herein are butt welds and methods of making such butt welds that include structural steel components joined by a combination of a fusion root weld on one side of the components and a friction stir weld on the other side of the components. The butt welds and methods of making disclosed herein alleviate the need for a backing support during friction stir welding.

The butt welds and methods of making such butt welds disclosed herein find utility in a broad range of applications for carbon and alloy steels, and in particular for pipeline construction in the oil and gas industry. Other applications include the fabrication of ships, pressure vessels, storage tanks, and offshore structures. The butt welds and methods of making disclosed herein are also useful in applications where large amounts of welding are necessary and there is an incentive for using high heat input welding procedures, faster welding processes, or a reduction in the number of welding passes. Non-limiting exemplary advantages of the butt welds and methods of making such butt welds disclosed herein include, but are not limited to, reduced fabrication costs compared to fusion welds, reduced time to make a weld compared to fusion welds, reduced labor and capital equipment cost compared to fusion welds, reduced weldment defects, reduced NDE requirements, reduced repair cost, and reduced need for skilled labor.

Friction Stir Welding Process:

Friction Stir Welding (FSW) is a solid-state joining technology which does not involve melting and solidification as does fusion welding. FSW is capable of joining butted surfaces without melting of the structural steel components and without adding filler material. During friction stir welding, a rotating tool is used to weld the two-different workpieces together by generating the heat through friction and plasticization. A non-consumable rotating tool is pushed into the materials to be welded and then the central pin, or probe, followed by the shoulder, is brought into contact with the two parts to be joined. The rotation of the tool heats up and causes the material of the work pieces to soften into a plastic state without reaching the melting point of workpiece material. As the tool moves along the joint line, material from the front of the tool is swept through this plasticized annulus to the rear, so eliminating the interface. Some material entering the plasticized region may progress around the rotating tool more than one revolution before exiting near the rear of the weld and then cooling to room temperature.

FSW can join in a single pass the entire wall thickness of pipes which would require multiple arc welding passes, however there are issues discussed below, which are resolved with the inventive embodiments disclosed herein. Alternatively, FSW can be used to join a substantial portion of the wall thickness, although not the entire thickness. In other words, in the application of pipeline fabrication, FSW can be applied to replace all pipeline fusion welding stations (shacks) or just some of the stations, and the FSW process can be applied internally or externally. The use of FSW can potentially reduce the number of welding shacks on the pipeline ROW producing cost savings due to a reduction in both workers and equipment.

Referring to FIG. 1, there are shown two tubular work pieces 1 and 2 which are positioned so that their faying surfaces 3 and 4 are in contact with each other. The work pieces, 1 and 2, are to be welded to one another along their faying surfaces 3 and 4. As shown in FIG. 1, the friction stir weld (FSW) tool comprises a welding head with a shoulder 5 and a pin 6. The relative sizes or shapes of the shoulder and the pin can be changed to suit specific welding needs and a variety of geometries are suitable for this disclosure. The work pieces 1 and 2 are held together by mechanical means such as clamping so that the faying surfaces 3 and 4 are in physical contact with each other before the start and during welding. The friction stir welding head 5 is rotated as shown by arrow 7, plunged downwardly into the work pieces 1 and 3 as shown by arrow 8 and advanced circumferentially as indicated by arrow 9. For a single sided weld, the depth of tool plunge is essentially the thickness of the work pieces or components being welded. For double sided welding, such depth can be approximately half the thickness of the work pieces being welded. As a consequence, a circumferential weld is produced. The FSW tool may be composed of any tool material capable of high temperature joining, which includes ceramics, metallics, composites and other derivatives thereof.

In the case of repairing a surface-opening crack, for example in a tubular work piece, a similar procedure to that described in connection with FIG. 1 is employed except that the pin 6 is not plunged all the way into the work piece but only superficially and the direction of the advancing tool follows the contour of the crack. This is referred to as friction stir repair or friction stir processing as distinguished from friction stir welding. Repair and/or treatment are also referred to as processing.

Figure 2:
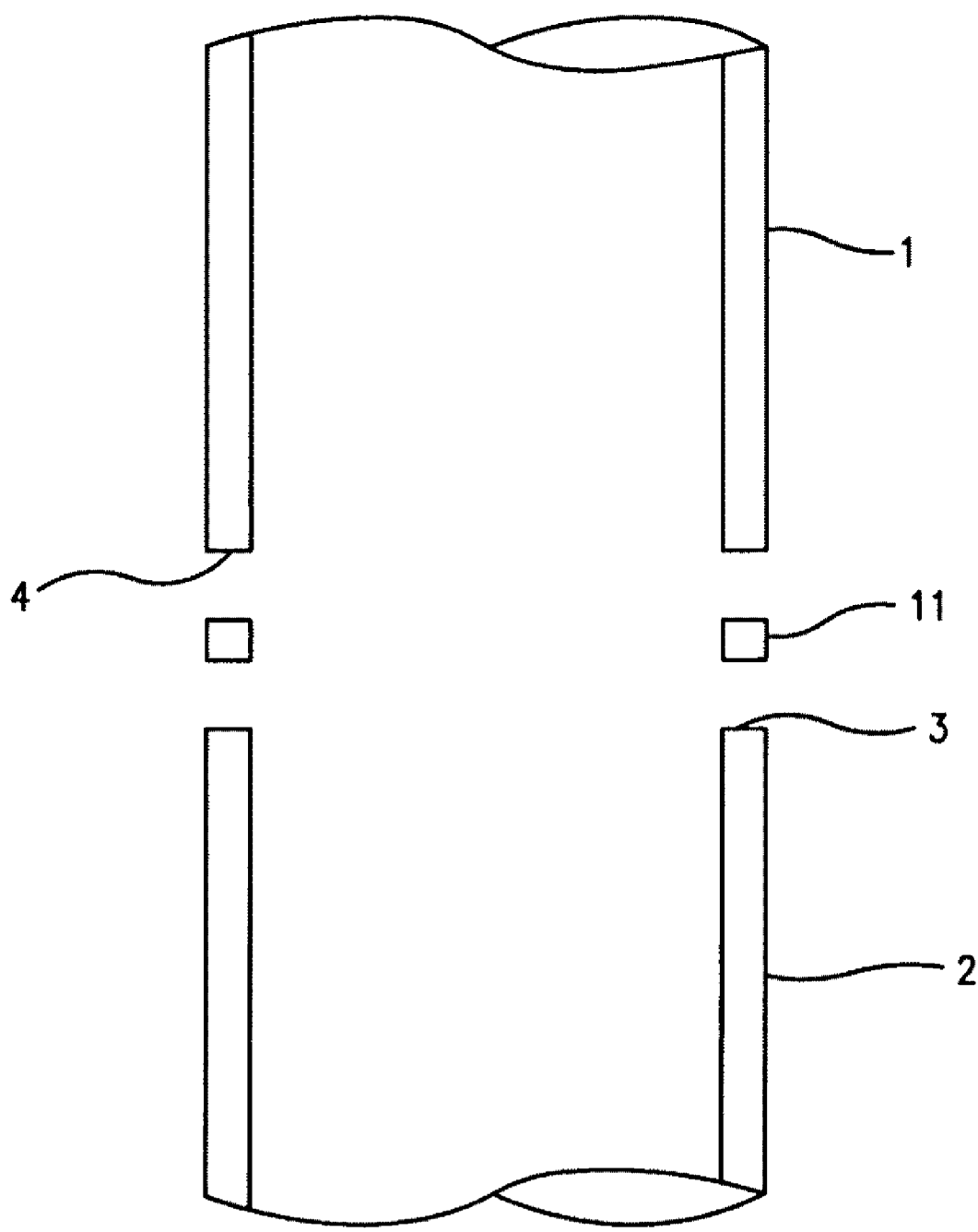
FIG. 2 is a diagram showing the use of a metallic shim in joining two tubular structural steel components by friction stir welding.

In the exemplary embodiment shown in FIG. 2, the work pieces 1 and 2 have a metal shim 11 interposed between the faying surface 3 and 4. The pieces are arranged so that the faying surfaces are in contact with shim 11. The FSW tool is advanced so as to form a weld incorporating the base metal of work pieces 1 and 2 and metal shim 11. This is referred to as friction stir welding as distinguished from friction stir repair or friction stir processing.

As will be readily appreciated, the work pieces (also referred to as structural steel components) described in the above embodiments can be formed of the same base metal (structural steel type) or they can be of different steel types. Similarly, the metal shim can be formed of the same metal as the work pieces for joining or it can be of a special alloy to enhance weld properties. Thus the structural steel components and the metal shim for friction stir welding can be formed of the same steel type or of differing materials depending on the application. The structural steels can be produced by conventional melting or secondary refining practices including, but not limited to, melting in a vacuum furnace, an electric arc furnace, a blast furnace, or a basic oxygen furnace, and typically have average base metal grain sizes from 2 microns to 100 microns. Non-limiting exemplary structural steels include API (American Petroleum Institute) Pipe Specification 5L pipe grades chosen from X50, X52, X60, X65, X70, X80, X90, X100 and X120. Other API structural steel grades such as 2H, 2Y, or similar, in addition to British Standards grades such as 4360-type plates, and similar, provide additional examples of non-limiting exemplary base materials. In yet another aspect, structural steels may include plain carbon and alloy steels including, but not limited to, AISI 1010, 1020, 1040, 1080, 1095, A36, A516, A440, A633, A656, 4063, 4340, 6150 and other AISI grades (including high strength grades). In still yet another aspect, structural steels may include ASTM grades A285, A387, A515, A516, A517 and other ASTM grades of carbon low alloy steels.

Figure 3:
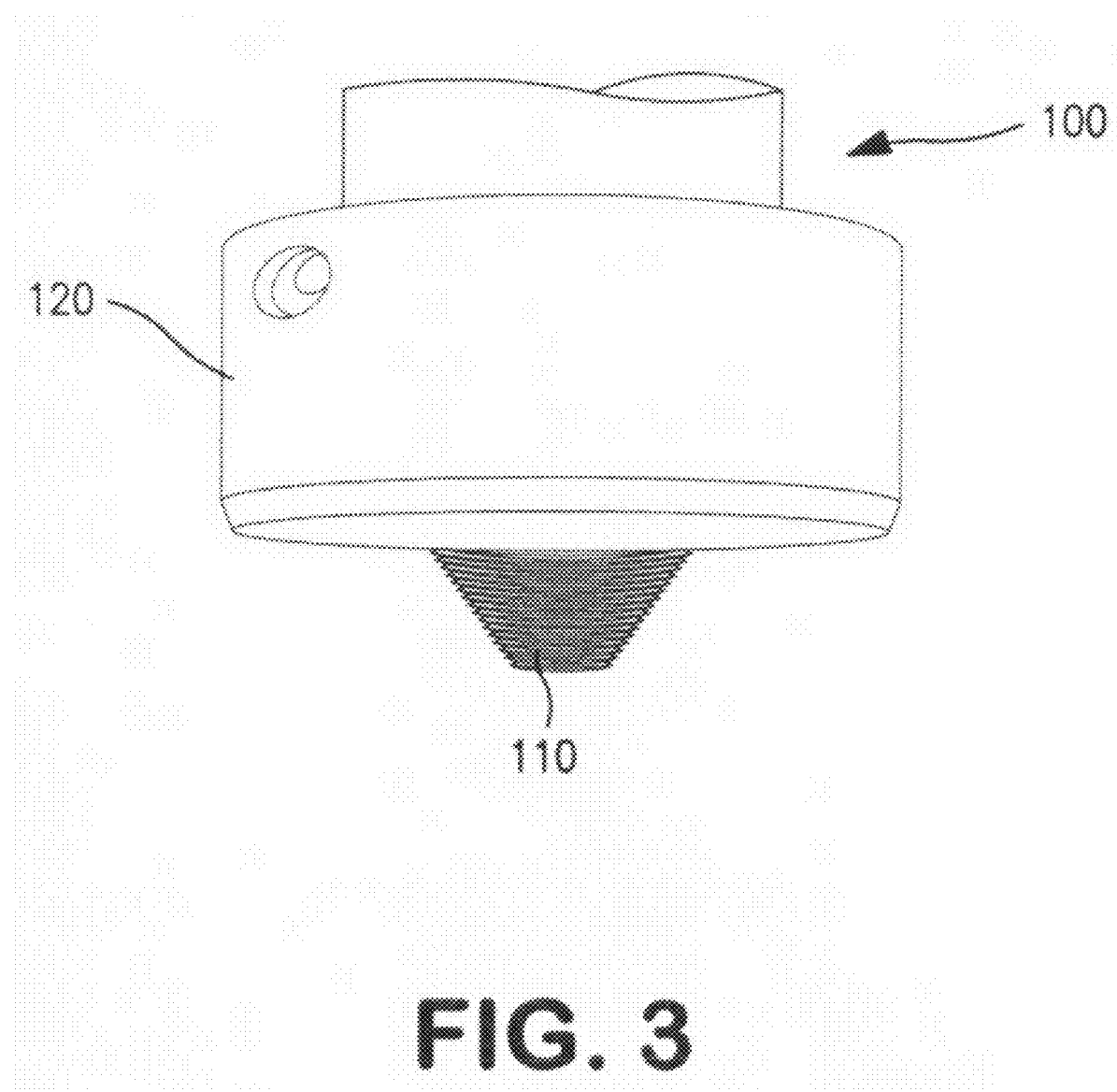
FIG. 3 depicts a common friction stir weld tool with the pin and shoulder indicated.

As shown in greater detail in FIG. 3, the FSW tool 100 includes two parts, a friction pin 110 and the tool shoulder 120. The shoulder 120 is a dominant means of generating heat during FSW, it prevents material expulsion, and it assists material movement around the tool. The function of the pin 110 is to primarily deform the material around the tool thereby forming a solid joint across initial faying surfaces. The FSW tool used in FSW of aluminum generally has a cylindrical pin with several small features such as large plunge pressure limits the choice of tool materials and tool design. For welding of steel, a variable pin diameter tool made up of tungsten-rhenium (W—Re), polycrystalline boron nitride (PCBN), combinations of these materials, alloyed versions of these materials, or other hard tool materials may be advantageous. A variety of FSW tool geometries and materials are compatible with this disclosure. This disclosure regards the use of a fusion weld to form a root weld and a friction stir weld to form the bulk of the weld that joins two structural steel components together. The tool described herein creates the necessary thermo-mechanical cycle to which the FSW process and base materials disclosed herein will respond favorably.

Figure 4:
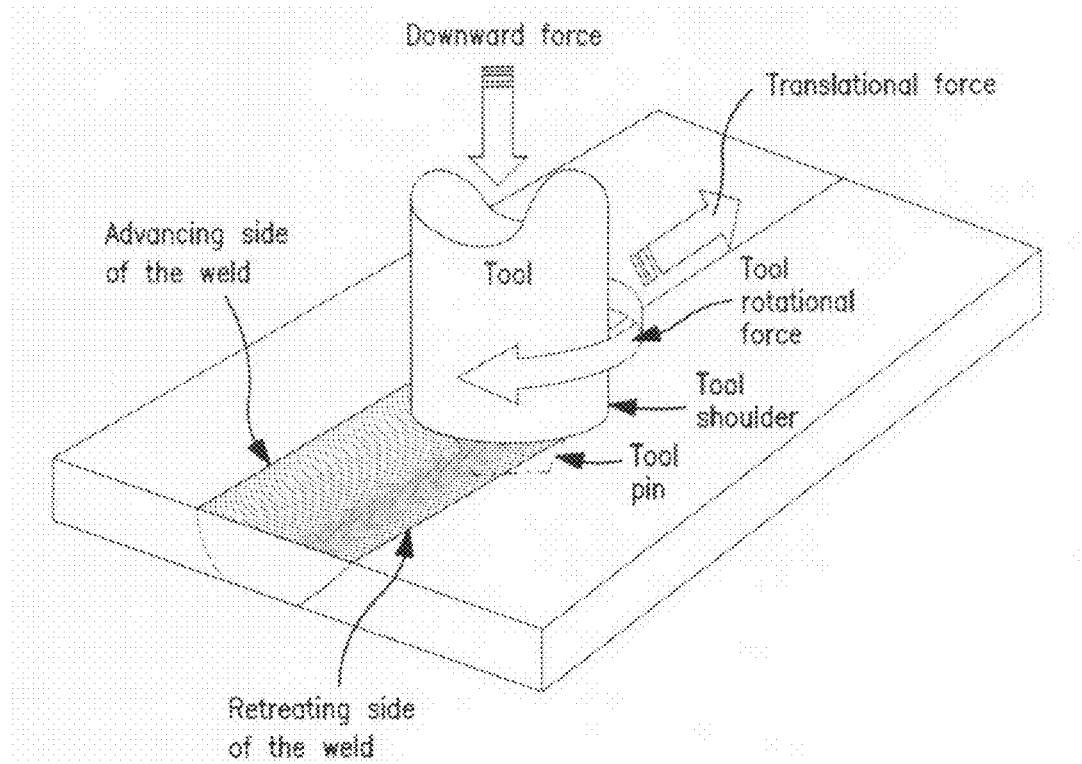
FIG. 4 depicts a schematic of two plates being butt welded by FSW without a backing support plate.
Figure 5:
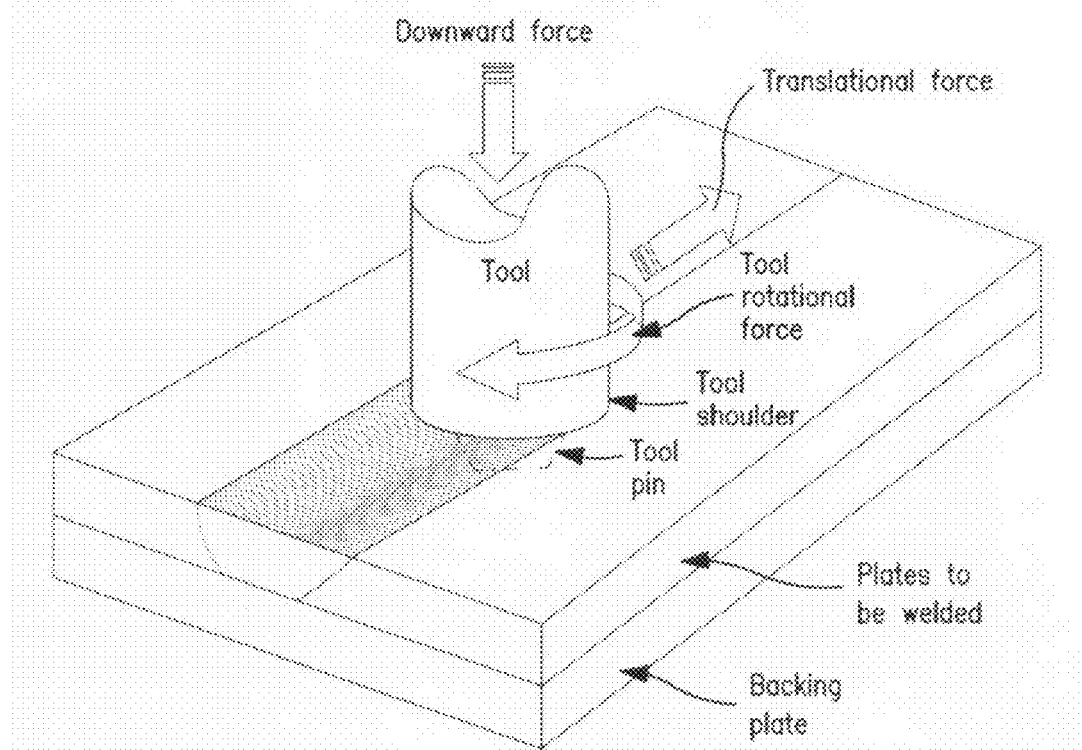
FIG. 5 depicts a schematic of two plates being butt welded by FSW with a backing support plate.

Referring to FIG. 4, during FSW, large forces are applied to the tool. These forces perform the functions of pushing the tool into the workpiece, rotating the tool to create the stiffing action, and traversing the tool along the joint being welded. These forces help generate heat by friction. The forces applied to the tool help maintain a critical pressure on the material being stirred or otherwise deformed so as to consolidate it into a defect free weld. The force that pushes the tool into the base metal is called the down force or, at the start of the weld, the plunge force. The large forces exerted during FSW, particularly the down force, often requires a backing support device to support the friction stir weld and keep the softened material at the bottom of the weld from displacing away from the weld joint. A backing support plate is shown in FIG. 5.

FIG. 6(a) shows a schematic cross section of the stir zone that surrounds the FSW tool during welding. The stir zone area and root weld area are indicated. FIG. 6(b) depicts a schematic cross section of the stir zone that surrounds the FSW tool during welding with a backing support plate to support the underside of the weld and prevent the softened root area from displacing away from the weld joint. The root area of friction stir welds typically requires support because it is weakened by the relatively high temperature during friction stir welding.

A defect free friction stir weld may be produced by using the correct tool design and process parameters. These process parameters, include one or more of, but not limited to, the welding travel speed of the friction stir weld tool, the rotational speed of the friction stir weld tool, the torsion loads applied to the friction stir weld tool, the down force load or the translational load on the friction stir weld tool, and the cooling rate of the weldment. The tool design and the aforementioned process parameters affect the material flow, which may be controlled to compensate for the high strain rates and temperatures during processing.

The benefits of FSW are primarily derived from the following characteristics: (1) lower temperatures required to perform the joining compared to fusion welds and lower temperatures in the joint cause less detrimental effects both within the joint and in the adjacent heat affected zone (e.g., coarse grains); (2) high degree of plastic deformation resulting from the rotation of the tool which results in fine grain size which is conducive to improved strength and toughness; and (3) avoidance of hydrogen embrittlement in weldments as compared to fusion welds, which are often prone to hydrogen embrittlement from the decomposition of residual moisture in the arc, (4) avoidance of solidification cracking as compared to fusion welds, which often produce low melting point films or other weak interfaces that can crack during weld cooling.

Application of FSW Process to Pipelines

The invention disclosed herein may be applied to any butt weld configuration, although it will be described in detail with respect to the application of welding pipelines for oil and gas transmission. Pipelines are built by girth welding individual joints of pipe together. Sometimes two pipes are first welded in a shop to create a "double joint" and then the double joints are transported to the pipeline right of way (ROW) for final field construction. In a typical field construction process, the pipe ends are butted together and then a welding process is used to fuse together the butted surfaces. Filler metal is also added to the weld as it is being made. The first weld bead that is applied to join the pipes is called the root weld and it can be applied internally or externally. After applying the root weld bead, subsequent weld beads are applied externally to fill the weld bevel. Welding shacks are used to protect the external welding activity from the weather elements. Typically, each shack is devoted to applying one or two welding beads.

Figure 7A:
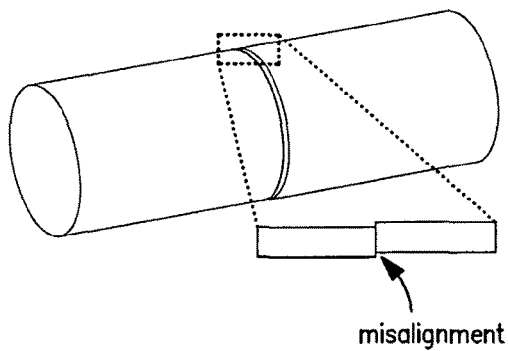
FIG. 7 depicts schematic cross sections of a pipe butt joint showing: (a) pipe wall misalignment, (b) a hypothetical situation where a friction stir weld is made onto a backing support with misalignment present, thus resulting in an unsupported edge, (c) the situation of perfect weld bevel fit-up, but insufficient penetration and a corresponding weld defect, and (d) penetration of the friction stir weld into the backing support.
Figure 7B:
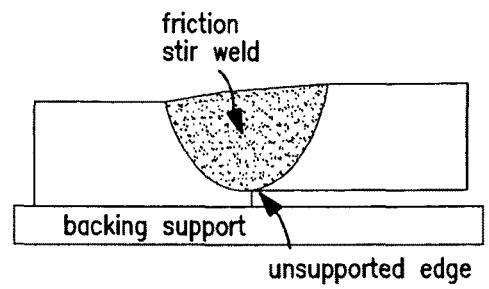

One possible way to use FSW to weld pipes together is by using an internal backing support and to weld the entire wall thickness with the FSW process. In this case it would not be necessary to place any other large pieces of equipment inside the pipes other than the backing support, and therefore an internal backing support could access the inside of the pipe with relative ease. The backing support may be in the form a pneumatically, electrically, or hydraulically powered internal lineup clamp that slides inside the pipe to expand against the internal pipe wall and to provide backing support for the FSW process. Any suitable means to power the backing support is applicable to the subject technology. However, an issue in implementing this approach related to pipe wall misalignment is that variations in pipe diameter, ovality, and wall thickness result in inevitable pipe wall misalignment when pipe ends are butted together. A schematic cross section of pipe wall misalignment is shown in FIG. 7(a). If a backing support was used in conjunction with FSW in an attempt to weld these pipes, then misalignment will create an unsupported edge as shown in FIG. 7(b). This unsupported edge can cause, or contribute to, weld defect formation. Although the use of a sufficiently powerful alignment clamp may remove most of the misalignment due to ovality, it cannot remove that due to diameter or wall thickness variation without permanent deformation of the pipe. Therefore, creating a defect free root area in misaligned pipe is problematic when an internal backing support is applied and the FSW process is relied upon for full weld penetration.

Figure 7C:
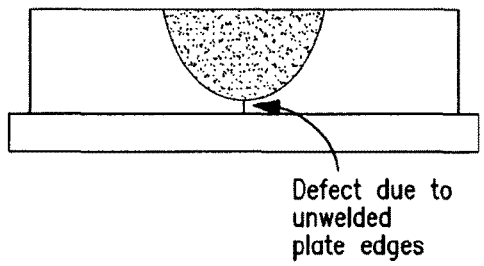
Figure 7D:
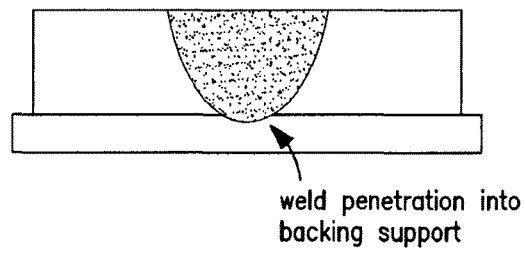

Even in the case where the pipe walls are perfectly aligned, there are still practical problems applying FSW externally to join two pipes with an internal backing support. The friction stir weld must have perfect penetration to accurately stir together the material in the weld root. There is risk in either not penetrating deep enough, in which case a weld defect will be left behind, or in penetrating too deep in which case the stir zone may penetrate into the backing support. FIG. 7(c) depicts schematic cross sections of a pipe butt joint produced by only the FSW process showing the situation of perfect fit-up, but insufficient friction stir penetration and a corresponding weld defect at the unwelded plate edge. FIG. 7(d) depicts schematic cross sections of a pipe butt joint produced by only the FSW process showing the situation of perfect fit-up, but of friction stir weld penetration into the backing support and a corresponding likely weld defect on the inside of the pipe.

Another option for pipeline construction using the FSW process is to make a first fusion root weld using an internal root welding machine. After applying the root weld, an internal backing support could be applied to the root area to support the joint for application of the FSW process. This option is, however, cumbersome because of difficulties accessing the inside of the pipe to apply the FSW backing support. In the construction process, the FSW weld would be applied one joint behind the internal root welder in the case of welding single pipe joints or two joints behind the internal root welder in the case of double pipe joints. In other pipe welding operations, like offshore construction, even longer pipe joints might be used making application of an internal backing support even more complicated. Because the internal root welder is applied at the front end of pipe construction, it essentially blocks the entrance to the pipeline. An internal FSW backing support would have to be deployed and operated a considerable distance from the front pipe end. Because the internal welder blocks the open pipe end, difficulties arise in providing power and control to the backing support. Also, coordinating the movement of the remotely operated backing support with the front end pipe welding activities becomes problematic. It is not necessarily convenient (or possible) to move the backing support at the same time the front end welding crew is ready to move on to the next pipe joint.

The instant invention alleviates the need for a backing support device by using a sufficiently large and strong root weld area that provides the necessary support for the subsequent FSW process. Disclosed below are the novel butt welds and methods of making such butt welds utilizing a combination of fusion welding and friction stir welding.

Exemplary Butt Welds and Methods of Making:

The butt weld disclosed herein is produced by first making a part-wall thickness fusion weld, and then completing the joint using the friction stir welding process. The fusion weld may be applied to one side of the structural steel components for joining. The friction stir weld may be then applied to the opposite side of the structural steel components for joining. For example in the welding of pipelines, if the fusion weld is first made on the inside of the pipe, then the friction stir weld would be applied to the outside of the pipe. An orbital friction stir welding machine may be used to make the friction stir weld on the outside of the pipe. The butt weld disclosed herein and method of making may be applied to butt welding of plates or pipes or other non-limiting configurations of structural steel components. In one advantageous form of the method of making a butt weld disclosed herein, in the joining of pipe, the fusion welding is first applied on the inside of the pipe and then friction stir welding is applied from the outside of the pipe. The internal fusion weld is useful in bridging any root gaps or pipe wall misalignment.

Figure 8:
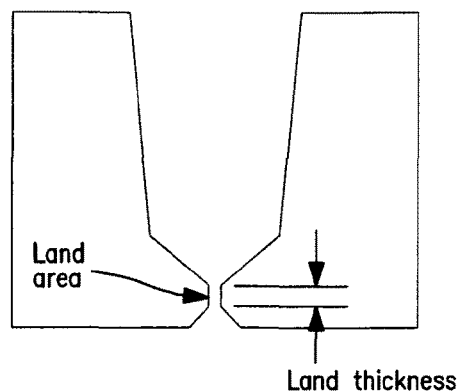
FIG. 8 depicts a schematic cross section of a typical conventional weld bevel used for mechanized pipe butt welding.

The fusion weld may be made using any suitable fusion welding process, including, but not limited to, gas metal arc welding, gas tungsten arc welding, flux cored arc welding, submerged arc welding, plasma arc welding, laser welding, laser hybrid welding, electron beam welding, flash butt welding, and homopolar welding. In the butt welding of pipe, any conventional internal root welding machine may be used to form a fusion weld on the inside of the pipe; however it has been discovered that a larger than normal root weld must be applied compared to existing commercial practice. Internal pipeline root welding has evolved over several decades into a fast and efficient process. This evolution has resulted in the established practice of depositing a root weld of very small size. The small size is partly motivated because of the limited thickness in the land region of a conventional weld bevel as shown in FIG. 8. The penetration of typical root welds must be limited to prevent burn through of the land and this situation leads to a small root weld size. Internal root welds are commonly only 2 to 5 mm from the cap surface to the weld root. The smallest root welds may only penetrate the base metal by 1 to 4 mm. Such a small root weld is insufficient for FSW backing support. Therefore, although a conventional internal root welding machine can be used to apply a root weld according to the disclosed invention, some fundamental changes must be made to the root weld bevel, the welding process, the welding procedure, or a combination of these factors. These changes are necessary to provide a large and strong enough weld for sufficient FSW backing support.

Figure 9A:
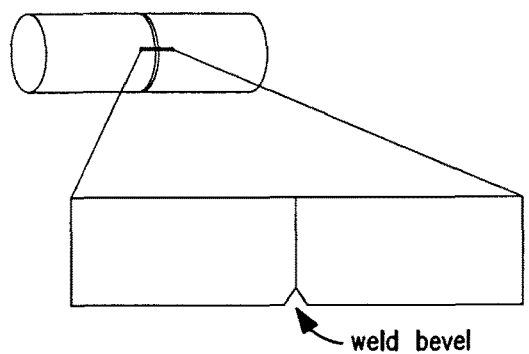
FIG. 9 depicts schematic cross sections of a pipe butt joint showing: (a) flat butted surfaces and small root bevel prior to fusion root welding and FSW, (b) flat butted surfaces after root welding and prior to FSW, (c) flat butted surfaces after root welding and FSW, and (d) flat butted surfaces after root welding and FSW with misalignment between components. In (c), root weld penetration is defined with this being one of the dimensions critical to root weld strength.
Figure 9B:
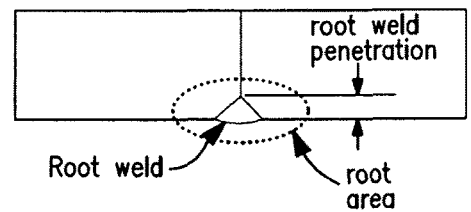
Figure 9C:
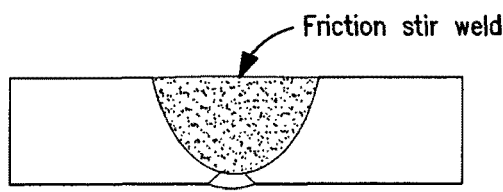
Figure 9D:
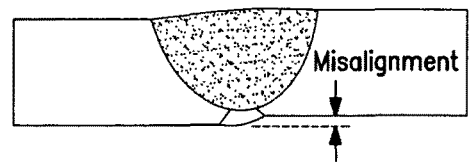
Figure 10A:
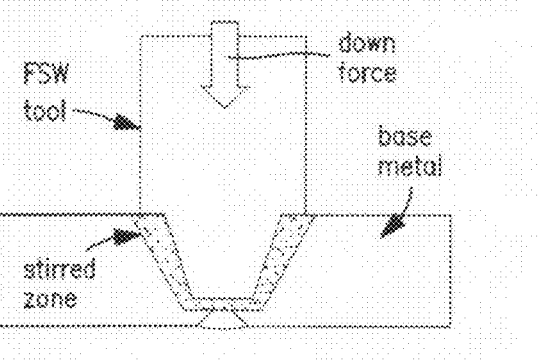
FIG. 10 depicts a schematic of friction stir welding showing: (a) the stir zone just penetrating the fusion root weld, (b) the presence of a significant weakened zone in the root area and the existence of dropout, (c) dropout after welding on the inside of a large diameter (30") pipe, (d) dropout on the underside of friction stir welded plate (with a crack in the dropout region).
Figure 10B:
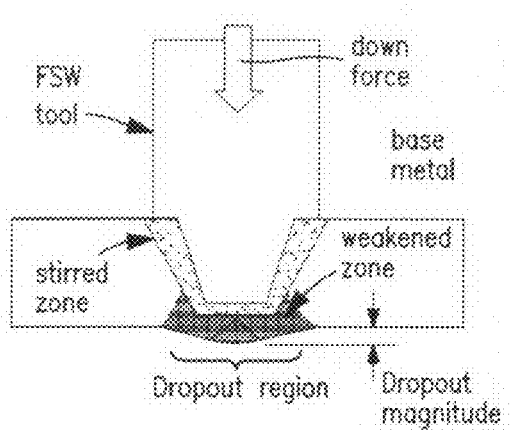
Figure 10C:
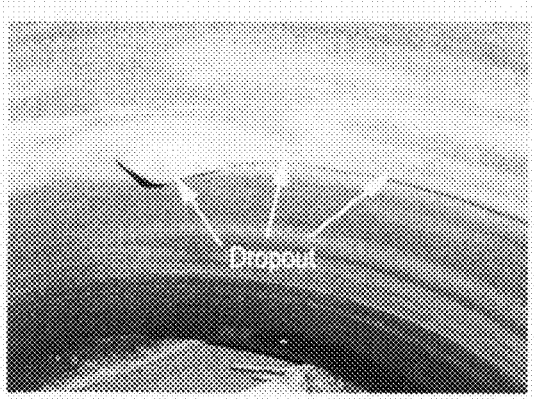
Figure 10D:
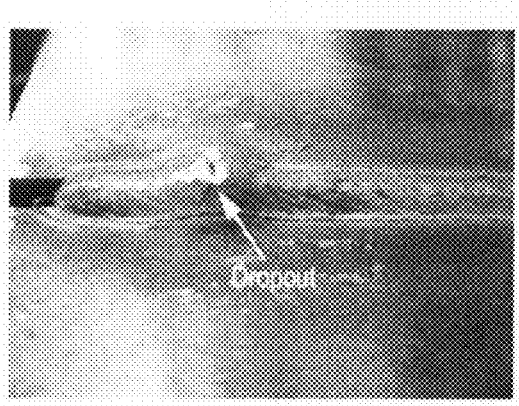

Root welding machine adjustments that increase weld penetration, while not feasible for conventional internal root welding, are feasible according to the disclosed novel welding approach because of the mass of material associated with the unbeveled faying surfaces that are joined by FSW. As shown FIGS. 9(a) and 9(b), the edges of the steel components being joined are much thicker than that of a conventional weld bevel (FIG. 8) because of the square edge preparation. The larger mass of material allows internal weld bevel geometry adjustments and welding process adjustments to increase the penetration of internal root welding which then enables a weld that is strong enough for FSW backing support. Root weld penetration depth is depicted in FIG. 9(b).

One embodiment of the butt weld disclosed herein includes two or more abutting structural steel components beveled on faying surfaces on one side of the components to form a suitably shaped fusion root weld groove and unbeveled on faying surfaces on the opposite side of the components and interconnected with a first fusion root weld on the beveled side of the components and a second friction stir weld on the unbeveled side of the components, wherein the first fusion root weld has a width ranging from 7 mm to 30 mm, a penetration depth ranging from 2 mm to 20 mm, and an overfill ranging from 2 mm to 5 mm, and wherein the stir zone of the second friction stir weld penetrates the first fusion root weld.

In an alternative form of this embodiment, the first fusion root weld may have a width ranging from 7 mm to 20 mm, or 7 to 15 mm, or 7 mm to 10 mm. The lower limit of the first fusion root weld width may be 7, or 8, or 9, or 10 mm. The upper limit of the first fusion root weld width may be 10, or 15, or 20, or 25, or 30 mm.

In an alternative form of this embodiment, the first fusion root weld may have a penetration depth ranging from 4 mm to 15 mm, or 5 to 10 mm. The lower limit of the first fusion root weld penetration depth may be 2, or 3, or 4, or 5, or 6, or 10 mm. The upper limit of the first fusion root weld penetration depth may be 10, or 12, or 15, or 17, or 20 mm.

In an alternative form of this embodiment, the first fusion root weld may have an overfill ranging from 2.5 mm to 4 mm. The lower limit of the first fusion root weld overfill may be 2, or 2.5, or 3 mm. In the case that a highly penetrating welding process is used, it may be possible to utilize a smaller weld overfill in the range of zero millimeters to 2 mm. The upper limit of the first fusion root weld overfill may be 3, or 3.5, or 4, or 4.5, or 5 mm.

The stir zone of the second friction stir weld may penetrate the fusion root weld to a depth ranging from essentially zero millimeters, as long as a continuous solid link is made between the fusion root weld and the friction stir weld, to 5 mm, or 0.5 mm to 3 mm, or 1 to 2 mm. The lower limit of the penetration depth of the stir zone of the second stir weld into the fusion root weld may be essentially zero, 0.125, 0.25, 0.5, 0.75, or 1 mm. The upper limit of the penetration depth of the stir zone of the second stir weld into the fusion root weld may be 2, or 3, or 4, or 5 mm. However, the upper limit of the penetration depth of the stir zone of the second stir weld into the fusion root weld may be limited by other practical considerations, such as wasted time, wasted energy, and excessive welding cost for an unnecessarily large penetration depth.

The suitably shaped fusion root weld groove may be chosen from a variety of shapes and configurations. Non-limiting exemplary shapes include u-shaped bevels, j-shaped bevels, v-shaped bevels, and combinations thereof. In one form, the suitably shaped fusion root weld groove may range from 2 to 15 nm in width and depth, or from 3 to 10 mm in width and depth, or from 4 to 8 nun in width and depth. The lower limit of the suitably shaped fusion root weld groove width and depth may be 2, or 3, or 4, or 5 mm. The upper limit of the suitably shaped fusion root weld groove width and depth may be 6, or 7, or 8, or 9, or 10 mm. In the case of a highly penetrating welding process, like laser hybrid welding or even pulsed GMAW, the weld bevel width and depth may be essentially zero if the chosen process can penetrate to a large enough depth, thus creating a large enough root weld to support the FSW process.

The two or more structural steel components may be API (American Petroleum Institute) Pipe Specification 5L pipe grades chosen from X50, X52, X60, X65, X70, X80, X90, X100 and X120. Other API structural steel grades such as 2H, 2Y, or similar, in addition to British Standards grades such as 4360-type plates, and similar, provide additional examples of non-limiting exemplary base materials. In an alternative form, the two or more structural steel components may be plain carbon and alloy steels chosen from AISI grades 1010, 1020, 1040, 1080, 1095, A36, A516, A440, A633, A656, 4063, 4340, 6150, and ASTM grades A285, A387, A515, A516, A517. In addition, the two or more structural steel components may include alloying elements. Non-limiting exemplary alloying elements include W, Ta, Nb, Mo, V, Cr and combinations thereof. These alloy elements are particularly useful for high temperature strength, which has important applications in strengthening the friction stir weld area.

The weld wire used for fusion welding of the root weld may be of the same or different composition to that of the two or more structural steel components for joining. In one form, the chemistry of the weld wire may include a ferrous chemistry and may further include alloying elements. Non-limiting exemplary alloying elements for the weld wire chemistry may be chosen from W, Ta, Nb, Mo, V, Cr and combinations thereof. These alloy elements are particularly useful for high temperature strength, which has important applications in strengthening the friction stir weld area.

An alternative embodiment of the butt weld disclosed herein includes two or more abutting structural steel components beveled on faying surfaces on one side of the components to form a suitably shaped fusion root weld groove and unbeveled on faying surfaces on the opposite side of the components and interconnected with a first fusion root weld on the beveled side of the components and a second friction stir weld on the unbeveled side of the components, wherein the first fusion root weld is of sufficient size and strength to support the down force applied in forming the second friction stir weld, and wherein the stir zone of the second friction stir weld penetrates the first fusion root weld to a sufficient depth to provide a continuously joined surface.

In this alternative embodiment, the sufficiently sized first fusion root weld may have a width ranging from 7 mm to 30 mm, or 7 mm to 20 mm, or 7 to 15 mm, or 7 mm to 10 mm. The lower limit of the first fusion root weld width may be 7, or 8, or 9, or 10 mm. The upper limit of the first fusion root weld width may be 10, or 15, or 20, or 25, or 30 mm.

In this alternative embodiment, the sufficiently sized first fusion root weld may have a penetration depth ranging from 4 mm to 15 mm, or 5 to 10 mm. The lower limit of the first fusion root weld penetration depth may be 2, or 3, or 4, or 5, or 6, or 10 mm. The upper limit of the first fusion root weld penetration depth may be 10, or 12, or 15, or 17, or 20 mm. However, the upper limit of the first fusion root weld penetration depth may be limited by other practical considerations, such as wasted time, wasted energy, and excessive welding cost for an unnecessarily large penetration depth.

In this alternative embodiment, the sufficiently sized first fusion root weld may have an overfill ranging from 2.5 mm to 4 mm. The lower limit of the first fusion root weld overfill may be 2, or 2.5, or 3 mm. The upper limit of the first fusion root weld overfill may be 3, or 3.5, or 4, or 4.5, or 5 mm. In the case that a highly penetrating welding process is used, it may be possible to utilize a smaller weld overfill in the range of zero millimeters to 2 mm.

The stir zone of the second friction stir weld may penetrate the first fusion root weld to a depth ranging from essentially zero mm to 5 mm, or 0.125 mm to 5 mm, or 0.5 mm to 3 mm, or 1 to 2 mm. The lower limit of the penetration depth of the stir zone of the second friction stir weld into the fusion root weld may be essentially zero, 0.125, 0.25, 0.5, 0.75, or 1 mm. The stir zone of the second friction stir weld may penetrate the fusion root weld to a depth ranging from essentially zero millimeters (as long as there is a continuous solid connection made between the fusion root weld and the friction stir weld) to 5 mm. The upper limit of the penetration depth of the stir zone of the second friction stir weld into the fusion root weld may be 2, or 3, or 4, or 5 mm. However, the upper limit of the penetration depth of the stir zone of the second stir weld into the fusion root weld may be limited by other practical considerations, such as wasted time, wasted energy, and excessive welding cost for an unnecessarily large penetration depth.

The suitably shaped fusion root weld groove for this alternative embodiment may be chosen from a variety of shapes and configurations. Non-limiting exemplary shapes include u-shaped bevels, j-shaped bevels, v-shaped bevels, and combinations thereof. In one form, the suitably shaped fusion root weld groove may range from 2 to 15 mm in width and depth, or from 3 to 10 mm in width and depth, or from 4 to 8 mm in width and depth. The lower limit of the suitably shaped fusion root weld groove width and depth may be 2, or 3, or 4, or 5 mm. The upper limit of the suitably shaped fusion root weld groove width and depth may be 6, or 7, or 8, or 9, or 10 mm.

The two or more structural steel components for this alternative embodiment may be API (American Petroleum Institute) Pipe Specification 5L pipe grades chosen from X50, X52, X60, X65, X70, X80, X90, X100 and X120. Other API structural steel grades such as 2H, 2Y, or similar, in addition to British Standards grades such as 4360-type plates, and similar, provide additional examples of non-limiting exemplary base materials. In an alternative form, the two or more structural steel components may be plain carbon and alloy steels chosen from AISI grades 1010, 1020, 1040, 1080, 1095, A36, A516, A440, A633, A656, 4063, 4340, 6150, and ASTM grades A285, A387, A515, A516, A517. In addition, the two or more structural steel components may include alloying elements. Non-limiting exemplary alloying elements include W, Ta, Nb, Mo, V, Cr and combinations thereof.

Alternatively, the two or more structural components may also be any clad pipe materials, whereby the base or carrier pipe is a ferrous steel chemistry and microstructure and the internal clad material is a corrosion resistant alloy such as Inconel or other Ni-base alloy. For clad pipe, the internal root weld may be made using a suitably selected corrosion resistant alloy filler material.

The consumable wire used for fusion root welding for this alternative embodiment may be of the same or different composition to that of the two or more structural steel components for joining. In one form, the chemistry of the weld wire may include a ferrous chemistry and may further include alloying elements. Non-limiting exemplary alloying elements for the weld wire chemistry may be chosen from W, Ta, Nb, Mo, V, Cr and combinations thereof.

One embodiment of the method of making a butt weld disclosed herein includes providing two or more abutting structural steel components beveled on the faying surfaces of one side of the components to form a suitably shaped fusion root weld groove and unbeveled on the faying surfaces of the opposite side of the components, fusion welding the beveled faying surfaces of one side of the components under conditions sufficient to form a fusion root weld, wherein the fusion root weld has a width ranging from 7 mm to 30 mm, a penetration depth ranging from 2 mm to 20 mm, and an overfill ranging from 2 mm to 5 mm, and friction stir welding the unbeveled faying surfaces of the opposite side of the components under conditions sufficient to form a friction stir weld, wherein the stir zone of the friction stir weld penetrates the fusion root weld to a depth ranging from essentially zero millimeters (as long as there is a continuous solid connection made between the fusion root weld and the friction stir weld) to 5 mm.

The first fusion root weld may be formed by one of any number of fusion welding processes. Non-limiting exemplary fusion welding processes include shielded metal arc welding, gas metal arc welding, flux cored arc welding, metal core arc welding, gas tungsten arc welding, plasma arc welding, submerged arc welding, laser welding, laser-hybrid welding, electron beam welding, flash butt welding, homopolar welding, and combinations thereof.

In addition to the type of fusion welding process, the control of the fusion welding process conditions and the choice of welding consumable may be selected to optimize the size and strength of the root weld. Non-limiting exemplary fusion welding process conditions that may be controlled include one or more of: chemistry of the weld wire, arc voltage, arc current magnitude, arc current waveform via manipulations, travel speed of the welding torch, weld wire feed rate, shielding gas composition, flux composition, and cooling rate of the first fusion root weld. Fusion welding process conditions may also include any arc current pulsing parameters or other controls of the current waveform that are intended to optimize weld penetration, weld bead fluidity, weld bead geometry, and/or weld properties.

The weld wire used for fusion welding of the root weld may be of the same or different composition to that of the two or more structural steel components for joining. In one form, the chemistry of the weld wire may include a ferrous chemistry and may further include alloying elements. Non-limiting exemplary alloying elements for the weld wire chemistry may be chosen from W, Ta, Nb, Mo, V, Cr and combinations thereof.

The cooling rate during fusion welding of the first fusion root weld may range from 10 to 200° C./sec, or 25 to 150° C./sec, or 50 to 100° C./sec.

The second friction stir weld is formed after the first fusion root weld is formed. The first fusion root weld should be of sufficient size, strength and toughness to prevent significant material expulsion from beneath the FSW tool. This displacement of material is referred to as dropout. If the fusion root weld is of insufficient size, strength, or toughness, then dropout can occur during friction stir welding, which may lead to weld defect formation and/or geometric noncompliances. The friction stir welding process conditions that may be controlled in forming the second friction stir weld include, but are not limited to, geometry of the friction stir weld tool, welding travel speed of the friction stir weld tool, rotational speed of the friction stir weld tool, torsion loads applied to the friction stir weld tool, the down force load or the translational load on the friction stir weld tool, the cooling rate of the second friction stir weld, and the simultaneous cooling of the first fusion root weld as the friction stir process is being applied.

The geometry of the friction stir weld tool used in forming the second friction stir weld may include a variety of configurations. Non-limiting exemplary geometries include shapes, ridges or patterns machined, molded, or manufactured into the tool shoulder or pin to improve material flow, increase depth of penetration, increase weld travel speed, improve underfill or surface finish and/or decrease welding defects. The travel speed of the friction stir weld tool used for FSW the second friction stir weld may range from 1 to 30, 5 to 25, or 10 to 20 inches per minute. The rotational speed of the friction stir weld tool used for FSW the second friction stir weld may range from 100 to 700, or 200 to 600, or 300 to 500 rpms. For some unique applications where it is desirable for productivity purposes to travel at high rates of travel speed, such as 15 inches per minute or above, it may be necessary to use high tool rotation rpms, such as for example 1000 rpm, or 2000 rpm.

During the application of the second friction stir weld, the down force load or the translational load on the friction stir weld tool should be sufficiently low to prevent the dropout of the fusion root weld during formation of the friction stir weld and also sufficiently high to prevent defects in the friction stir weld. For example, the down force load or the translational load on the friction stir weld tool may be greater than or equal to 1000 $lb_f$ and less than or equal to 30,000 $lb_f$, or greater than or equal to 5000 $lb_f$ and less than or equal to 25,000 $lb_f$, greater than or equal to 10,000 $lb_f$ and less than or equal to 20,000 $lb_f$. The cooling rate of the friction stir weld during application of the second friction stir weld may range from 10° C. per second to 400° C. per second, or 20° C. per second to 300° C. per second, or 50° C. per second to 200° C. per second, or 75° C. per second to 150° C. per second.

The method of making a butt weld disclosed herein may also include the simultaneous cooling of the fusion root weld during application of the friction second stir weld. The simultaneous cooling of the fusion root weld during application of the second friction stir weld may produce cooling rates ranging from 10° C. per second to 200° C. per second, or 20° C. per second to 175° C. per second, 50° C. per second to 150° C. per second, or 75° C. per second to 125° C. per second. A variety of methods may be used to cool the first fusion root weld during application of the second friction stir weld to help prevent dropout. Non-limiting exemplary methods used to cool the first fusion root weld during application of the second friction stir weld include forced fluid cooling with a gaseous medium and forced fluid cooling with a liquid medium. The gaseous or liquid medium used during forced fluid cooling may be water, glycol, carbon dioxide, nitrogen, and combinations thereof.

Another embodiment of the method of making butt welds disclosed herein is depicted in FIG. 9. Referring to FIG. 9(a), an exemplary small, internal weld bevel is shown machined into the pipe walls at the butted interfaces for two pipe segments. This weld bevel may increase penetration of the fusion weld, which may provide increased support for the subsequent friction stir weld applied from the opposite side of the pipe. FIG. 9(b) depicts an exemplary butt joint after application of the internal fusion root weld in the weld bevel by a suitable fusion welding process and prior to friction stir welding. The magnitude of root weld penetration is shown in FIG. 9(b). After fusion root welding, the remainder of the pipe wall thickness may be joined using the friction stir welding process. FIG. 9(c) depicts an exemplary butt weld after the friction stir welding step with complete joining of the two structural steel components achieved through a combination of fusion root welding and friction stir welding. FIG. 9(d) depicts the case where there is misalignment between two abutting structural steel components for joining and shows how the fusion root weld may be effective in bridging the gap across wall misalignment between the two components.

One aspect of the butt welds disclosed herein is that the root area (the area in the vicinity of the fusion root weld bead) be sufficiently strong to support the down forces experienced during the FSW process. When the root area is sufficiently strong, the use of a backing support may be avoided during friction stir welding. Root area strength may be necessary to ensure that the mating butt surfaces are completely joined and that defects are minimized or eliminated. The methods of making the butt welds disclosed herein define the conditions to form a sufficiently strong root area, which is defined as strength necessary to prevent significant dropout of the fusion root weld during application of the down forces of friction stir welding. More particularly, if the fusion root weld is too weak, the fusion weld material in the root area of the butt joint may be displaced away from the pipe wall during FSW. For the case of pipe welding, the displacement will be toward the inside of the pipe for an internal root weld or toward the outside for an external root weld (the external root weld being used with an internally applied friction stir weld). The definition of significant dropout may depend on the specific application. For many applications limiting the dropout to within 2 mm may be sufficient, however, for more stringent applications where the friction stir weld requires more rigidity for complete consolidation, the dropout may be limited to 1.5 mm. Some applications will require even closer control of dropout for optimal welding and limits of 1 mm, or even 0.5 mm may be necessary.

FIG. 10 depicts situations involving dropout of the fusion root weld due to the FSW down forces. In FIG. 10(a), the root area including the fusion root weld has been designed to be strong enough to prevent dropout. In contrast for FIG. 10(b), the root area material below the friction stir zone is not sufficiently strong to support the FSW down forces, and hence dropout occurs. Drop out magnitude is depicted in FIG. 10(b). Also, shown in FIG. 10(b) is the weakened zone, which includes both the fusion root weld metal and the adjacent base material. The weakened zone is created by the heat applied during FSW. Process optimization may be required to obtain sufficient root area strength and rigidity necessary to prevent dropout, and thus ensure complete joining of the butted surfaces with a minimization of weld defects. In contrast to FIG. 10(b), the root area material in FIG. 10(a) may be still somewhat weakened by the FSW heat; however not to the extent that significant dropout occurs during FSW. Hence, in FIG. 10(a), no weakened zone is indicated due to sufficient strength of the root area to prevent dropout during FSW.

FIG. 10 also shows two exemplary photographs of dropout. FIG. 10(c) depicts dropout on the inside of a pipe for the case of only an externally applied friction stir weld and no internally applied fusion root weld. The sample of FIG. 10(c) was made to test dropout on plain pipe (not a butted pipe joint) with the most severe area of dropout occurring at the start of the weld during the initial plunge of the FSW tool. As the FSW tool was traversed along the pipe circumference, the FSW down forces were reduced from that used during the plunge and the dropout decreased. FIG. 10(d) depicts a photomicrograph of dropout on the underside of a plate butt weld sample made by first applying a root weld using the gas metal arc welding process. The root weld joined about 20% of the plate thickness. The plates were then turned over and a friction stir weld was applied to join the remaining plate thickness. Dropout occurred at the beginning of the friction stir weld (during the plunge) as shown in FIG. 10(d) with a crack also occurring in the dropout area. FIG. 10(d) indicates that the design of the fusion root area is a factor in preventing dropout during FSW. Simply forming a fusion root weld typical of conventional internal welding for pipeline fabrication will not likely result in sufficient root area strength and toughness to prevent dropout of the fusion root weld during subsequent friction stir welding.

Because the initial plunge force can be greater than the down force applied during tool travel, steps can be taken to reduce the plunge force so as to decrease dropout during the plunge sequence. For example, one method includes predrilling a hole or cavity at the start of the weld so that the tool and pin experience an absence of material, and hence high plunging forces become unnecessary. Another method involves preheating the plunge region to weaken the base material. Any other suitable means to reduce plunge force can be used according to the concepts of the disclosed novel welding technology disclosed herein.

Figure 11:
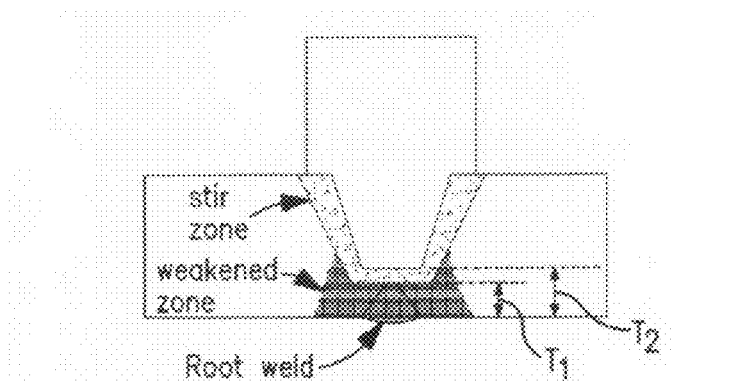
FIG. 11 depicts a cross section of a novel butt weld disclosed herein showing the critical dimension $T_1$ with a dimension large enough to prevent dropout, but small enough to permit adequate root weld penetration.

The butt welds and methods of making disclosed herein have been designed so as to prevent root area dropout. Two features of the weld root area that are influential in ensuring its strength, and thus ability, to support the FSW process are the size of the root area and the material strength of the root area at elevated temperature. In terms of the size of the root area, referring to FIG. 11(a), the dimensions $T_1$ and $T_2$ are influential factors in forming a root area of sufficient strength to prevent dropout. $T_1$ is defined as the distance between the surface of the workpiece where fusion root welding is applied and the bottom of the friction stir zone. $T_2$ is defined as the distance between the surface of the workpiece where fusion root welding is applied and the bottom of the friction stir pin. Either $T_1$ or $T_2$, or any other similar dimension that characterizes the mass of material between the friction stir weld and the workpiece surface nearest the root weld, may be used in designing the root area so as to obtain a sufficient strength to prevent dropout during FSW. $T_1$ or $T_2$ should be designed to accommodate two goals with the first being creation of sufficient size in the weakened zone to prevent dropout and with the second being a root area of sufficient size such that the fusion weld is penetrated by the friction stir weld.

From the standpoint of strength, it is advantageous that $T_1$ (or $T_2$) be as large as possible without negatively impacting the ability to apply the root weld. The fusion root weld depth as defined by $T_1$ or $T_2$ in FIG. 11 or root weld penetration as shown in FIG. 9(b) should be large enough to enable subsequent cross weld penetration by the friction stir weld. For cross weld penetration, the fusion root weld should have a penetration depth greater than the dimension $T_1$. In one form, the fusion root weld penetration depth (see FIG. 9(b)) may be greater than or equal to 2 mm, or 3 mm, or 4 mm, or 5 mm, or 6 mm, or 10 mm.

Figure 12:
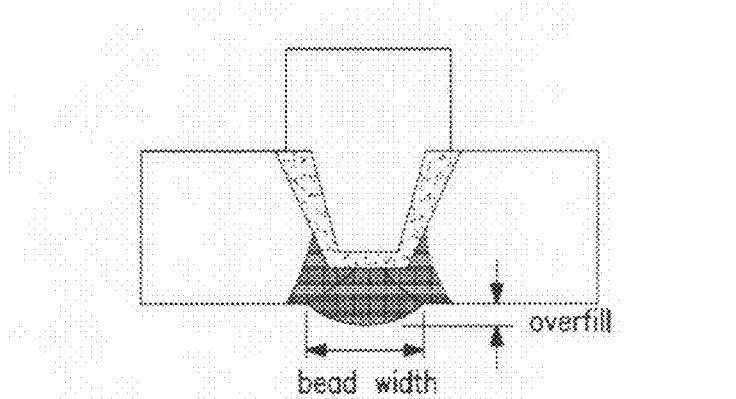
FIG. 12 depicts a cross section of novel butt weld disclosed herein showing a large root pass and two of the dimensions that influence the strength of the root area (overfill and bead width).

Two other dimensions that are influential in determining the strength of the root area are the root weld bead width and the root weld overfill as illustrated in FIG. 12. Both of these dimensions, in addition to $T_1$ or $T_2$, determine the overall size of the root weld. The root weld overfill is defined as the peak root weld bead height extending beyond the surface to be fusion welded. FIG. 12 depicts a particularly large root weld with the two other factors impacting root area strength, overfill and the bead width indicated. Increasing overfill and/or bead width will strengthen the root area and help prevent dropout. A large root weld is particularly useful in the case if the root weld metal is of greater strength than the base metal. One non-limiting exemplary option for increasing root weld strength is alloying the weld consumable wire. Non-limiting exemplary alloying elements for increasing strength may be chosen from W, Ta, Nb, Mo, V, Cr and combinations thereof. These alloy elements are particularly useful for high temperature strength. Hence, the fusion root weld strength may be tailored based upon the size of the root area ($T_1$ or $T_2$, overfill, and/or root weld bead width) as well as by use of a high strength consumable wire for fusion root welding. In one form, the overfill may be greater than or equal to 2 mm, or 2.5 mm, or 3 mm. The upper limit of the first fusion root weld overfill may be 3, or 3.5, or 4, or 4.5, or 5 mm. In the case that a highly penetrating welding process is used, it may be possible to utilize a smaller weld overfill in the range of zero millimeters to 2 mm. In another form, the root weld bead width may be greater than or equal to 7 mm, or 8 mm, or 9 mm. The upper limit of the first fusion root weld width may be 10, or 15, or 20, or 25, or 30 mm.

When forming the butt welds disclosed herein for pipeline joining applications, there are some practical limitations regarding the size of the root weld that may be produced in order to achieve cross weld (fusion and friction stir) penetration. More particularly, when the fusion root weld is internal to the pipe, it is formed orbitally, or in other words, in the 5G position as defined by the American Welding Society. This welding position means that the pipe remains stationary while the fusion welding machine traverses the circular butt weld joint. The fusion welding process should be capable of applying the root weld along the entire 360° rotation of the root weld joint and this includes welding in the vertical positions at 3 o'clock and 9 o'clock as well as in the overhead position at 12 o'clock. This multi-position fusion welding scenario makes it impractical to apply a very large root weld bead. In other than the down hand position (6 o'clock), a large root weld bead would be significantly affected by gravity, which may cause the fusion weld pool to droop, which may result in an undesirable weld bead shape or, in an extreme case, the weld bead may simply fall (drip) out of the weld joint. Certain welding techniques and/or processes may be used to offset the challenges of gravity during 5G pipe welding. In one non-limiting example, in the case of gas metal arc welding, the use of a pulsed power supply may increase root weld bead penetration while still maintaining a relatively small weld bead. Any other manipulations of the arc power parameters (such as current waveform) can be used to optimize weld penetration, weld bead fluidity, weld bead geometry, root weld size, or weld properties to further offset the influences of gravity. Proper selection of welding consumables may also be used, which are known to those skilled in the art of welding engineering. Adjustment of molten pool surface tension through wire or shielding gas composition may be useful. In another non-limiting example, a laser-hybrid internal welding process may be used to increase penetration while still maintaining a 5G-capable root weld. The laser-hybrid internal welding process utilizing a laser hybrid-internal root welding machine may be particularly advantageous to form internal root welds in pipeline for the butt welds disclosed herein. More particularly, the laser-hybrid process for the internal root weld and the external friction stir process may be combined as one advantageous method for optimizing the root area geometry and strength to allow for the elimination of a backing support plate during friction stir welding.

There are additional practical limitations regarding the size of the root weld related to internal pipe access and to disruption of fluid flow. With regard to pipe access, internal pipe maintenance activities such as inspection pigging require relatively smooth root welds for ease of travel, which means that excessive cap reinforcement is undesirable at some level depending on the capabilities of the pigging device. With respect to fluid flow, efficient pipeline operations and optimized fluid flow throughput require relatively smooth root welds without excessive reinforcement. Therefore, practical limitations exist that prevent unlimited root weld reinforcement as a means to produce strong FSW backing support.

As previously described, the two factors of the root weld area that may be influential in controlling the magnitude of the dropout are: 1) weakened zone size, and 2) material strength within the weakened zone at elevated temperatures. One factor to reduce dropout and prevent FSW defects is to increase the strength of the weakened zone. This zone is comprised primarily of two materials, the base metal and the root weld. The root weld consists of the weld metal and HAZ. The strength of weakened zone may be increased by one or more of the following exemplary, non-limiting methods: strength-enhancing alloying, increased root weld size, increased root weld penetration, and enhanced cooling of the fusion root weld.

In terms of strength-enhancing alloying, the strength of weakened zone may be enhanced by selective alloying of material chemistry to produce higher strength. In particular, elements such as, but not limited to W, Ta, Nb, Mo, V and Cr may be used to enhance the elevated temperature strength of structural steels disclosed herein. Alloying may also be used to optimize the root area and weakened zone strength. The chemistry of the base metal may be alloyed with strength enhancing elements to improve elevated temperature strength of the weakened zone. This may reduce dropout and reduce weld defects. In the case where a filler material is used in the fusion root welding process, alloying with elements, including, but not limited to W, Ta, Nb, Mo, V and Cr may also be used to enhance strength. If a filler material or shim is used with the friction stir process, alloying with elements, including, but not limited to W, Ta, Nb, Mo, V and Cr may also be used to enhance strength of the root area and weakened zone strength.

In terms of root weld size, the use of a larger and/or stronger root weld provides more material and/or stronger material under the friction stir tool to resist the down force applied through the tool, which may also reduce dropout and the propensity for weld defects. The root weld size may be increased by one or more of the following exemplary, non-limiting, fusion welding parameters: increased weld bevel volume, increased filler wire feed rate, and increased weld current. There may be limitations of root weld size when applied to the inside of the pipe. Higher strength root welds may be particularly beneficial for thinner wall pipes where the process may be challenged due to inherent weakened zone thickness. In particular, if because of wall thickness, the weakened zone is thin, then dropout may still be improved and controlled by using a larger, stronger fusion root weld.

In terms of root weld penetration the novel approach disclosed herein includes square butted edges in the area to be joined by FSW and this relatively thick geometry allows for higher penetration welding techniques compared to what is feasible during conventional internal root welding with a thin land. Increasing root weld penetration increases the root area thickness $T_2$, and hence the overall strength of the weakened zone. Other methods may also be used to increase the root weld penetration, including, but not limited to, increasing the weld bevel depth, and/or changing the bevel geometry to allow increased penetration by the weld arc, increasing weld current or using a pulsing waveform, or other welding power parameter manipulations (such as current waveform) choosing a more advantageous shielding gas to enhance penetration, and selecting a welding process for enhanced penetration. For example, laser or laser hybrid welding may be particularly advantageous in increasing the size of the root dimension $T_2$ to increase root weld penetration.

In terms of enhanced cooling of the weld joint, cooling from either the top or bottom of the base metal may be used during application of the welding processes disclosed herein to reduce the metal temperature, and thus, increase the strength of the root area. The cooling may be applied to the fusion root weld to increase its as-welded strength. Enhanced cooling may also be applied to the fusion root weld area on the underside of the base metal during application of the friction stir weld to enhance strength. This may reduce the temperature of the root area and the weakened zone during FSW. Enhanced cooling may also be applied to the outer surface of the base metal (the side of the weld where FSW is being applied), which may reduce the temperature of the friction stir weld and the fusion root area.

The enhanced cooling of the fusion root weld region may be accomplished in a variety of non-limiting ways. The cooling medium for enhanced cooling may be either in fluid or solid form with a flowing fluid including either a gaseous or liquid medium. When a fluid is used, it may be inherently cold, such as for example, an expanding gas, or it may be chilled through a pre-cooler before it is applied to the weld region. The use of fluid as a cooling medium may reduce the temperature of the root weld region by extracting heat though the heat transfer mechanisms of conduction, convection and a combination thereof. Solid material with adequate thermal conductivity may also be used to extract the heat from the root weld region by conduction. In this case, metal blocks may be placed in contact with the regions near the root weld. In one form, the blocks may be chilled by an internal fluid flow. Chemical materials in the form of powder, paste or spray may also be applied on the weld region to extract the heat by conduction, convection, radiation, phase change, or any endothermic reaction.

When the use of enhanced cooling to either the root weld or to the friction stir weld is desirable, there may be inherent advantages regarding field fabrication in cold climates. In the case of low ambient temperature, the cold air can be used to assist in weld cooling. This can be accomplished by using the cold air as a forced cooling fluid or the cooling can be somewhat passive by simply allowing the ambient air to naturally impact the weld region.

In another form of the butt welds and method of making disclosed herein, a mechanical support may be used to enhance the strength of the root weld region and prevent dropout. Although it may be typically undesirable to use internal mechanical support because of the "front end" welding activities during pipeline construction, there may be some applications where such restrictions are minimal or do not exist. In this case, it may be useful to use mechanical support on the inner diameter of the pipe to assist in resisting the friction stir tool load. The use of mechanical support along with a fusion root weld bead may reduce the bead size requirement as it should also share the load imparted during FSW.

In the form of a combined fusion root weld and a backing support, the backing support disclosed herein is considerably different from conventional mandrels or anvils used for backing support. Whereas conventional mandrels and anvils, such as described by U.S. Pat. No. 6,732,901 and U.S. Patent Publication No. 2006/0081683 A 1, are designed to be very rigid so as to support the full down force of the friction stir process, and are designed to support the workpiece at high temperatures, a less demanding design is suitable when the mandrel is used in conjunction with a fusion root weld. Because the fusion root weld can support considerable down force, a secondary mandrel can be of minimal size and strength compared to the conventional approach. Also, a secondary mandrel does not have to accommodate high temperatures resulting from direct contact with the friction stir weld. Because the fusion root weld lies between the friction stir weld stir zone and the interface between the mandrel and workpiece, the temperatures experienced by the mandrel surface are much lower than for the conventional case when the mandrel is in essentially direct contact with the weld region. Conventional mandrels may be designed with high temperature coatings to survive contact with surfaces that reach peak temperatures on the order of 800° C. and higher. A secondary mandrel used in conjunction with a fusion root weld, does not require such coatings and can be designed to support work surfaces at temperatures less than 800° C.

Figure 13:
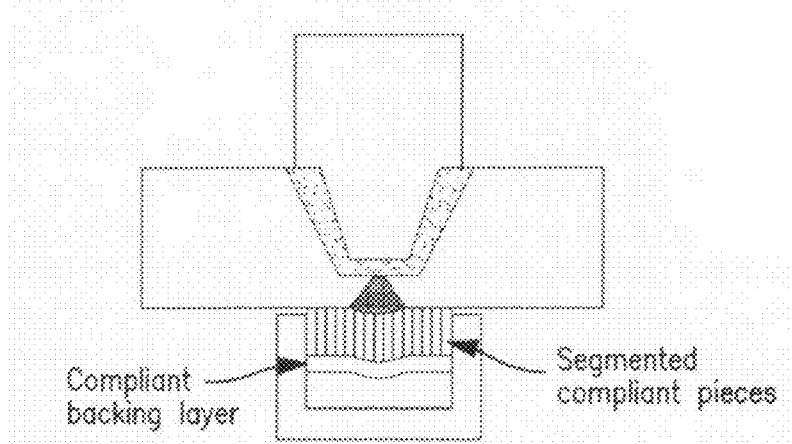
FIG. 13 depicts a novel butt weld disclosed herein including a mechanical compliant backing support layer for the fusion root weld during formation of the friction stir weld.

One other significant design factor for a secondary mandrel or anvil used in conjunction with a fusion root weld disclosed herein is that the surface material of the secondary mandrel can be optimized by using a compliant layer to accommodate the local geometry of the root weld region. As the secondary mandrel is compressed against the surface where the fusion root weld has been previously deposited, a compliant layer is useful to conform to the shape of the fusion root area, thus adapting to local geometries that may vary depending on root weld shape such as width, overfill, and toe geometry, as well as misalignment geometries of the workpieces themselves. The mandrel compliance can be designed as a material compliance or mechanical compliance. In the case of material compliance, a high temperature polymer may be used as the contacting material while a more rigid metal support may provide the backing for the compliant polymer. The polymer, or similar material, may contain a metallic-based additive or a ceramic additive thus generating a composite compliant layer. In the case of mechanical compliance, one such design, as shown in FIG. 13, includes using relatively small, segmented metal pieces as the primary contact pieces of the mandrel whereby the segmented pieces are backed or supported by a flexible layer that is expandable through either hydraulic or mechanical means. Any combinations of these methods (material compliance, mechanical compliance or combinations thereof) or other suitable means of compliance may be acceptable to provide the desired secondary mandrel necessary to apply modest support to the root weld area.

Experimental Methods for Determining Fusion Weld Root Area:

Experimental methods, numerical/analytical methods, and combinations thereof may be used to determine the dimensions of the fusion root weld area in order to achieve sufficient root area strength to prevent dropout during FSW. Numerical/analytical methods may utilize calculations or computer-based modeling.

In one form of the butt weld and methods of forming disclosed herein, the fusion weld root area dimensions sufficient to prevent dropout during FSW may be determined by conducting experiments whereby different root weld sizes are applied to structural steel plate or pipe components, and then FSW is performed to complete the joint. The root weld size may be varied by one or more of the following exemplary, non-limiting parameters: increasing the bevel size or depth (see FIG. 9(b)), increasing arc current, and/or using a pulsed current waveform or other manipulations of the current waveform, or optimal selection of welding consumables. FSW may then be conducted without the use of a backing support applied to the fusion weld root area over the range of welding parameters selected. After FSW, the amount of dropout (dropout magnitude or depth) may be quantified by the measurement technique shown in FIG. 11(b). Using this approach, fusion root weld size may be correlated to dropout magnitude or depth. The fusion root welds may be inspected using any suitable non-destructive examination (NDE) technique, such as x-ray or ultrasonics, to monitor the weld for internal defects. Through inspection, the root weld size and dropout magnitude or depth may be correlated with weld quality. In addition, the experimental root welds may be cross-sectioned, polished and examined to quantify the dimensions $T_1$ and $T_2$.

Figure 14A:
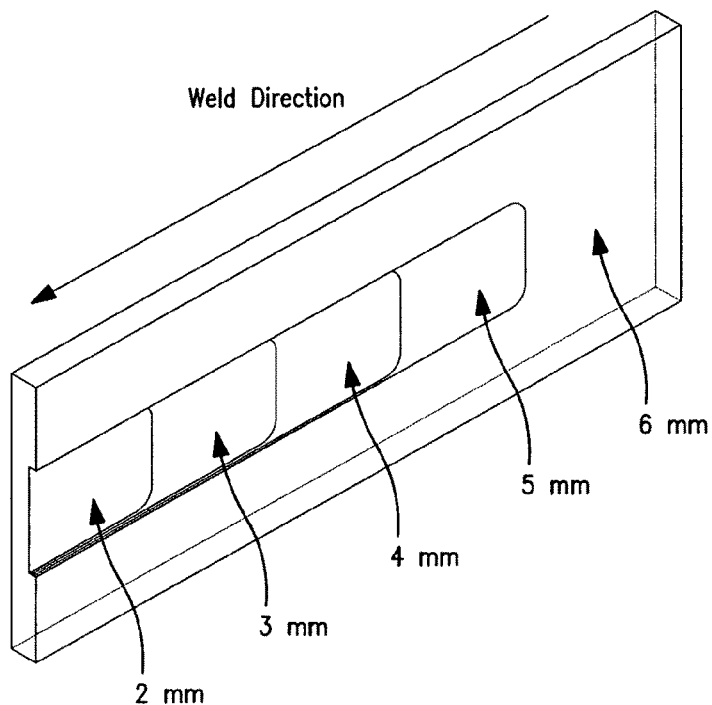
FIG. 14 depicts the results of an experiment to determine the minimum weakened zone thickness showing: (a) a schematic perspective view of a stair-step channel machined in a back of plate sample prior to friction stir welding, and (b) a schematic side view of the machined plate sample being friction stir welded.
Figure 14B:
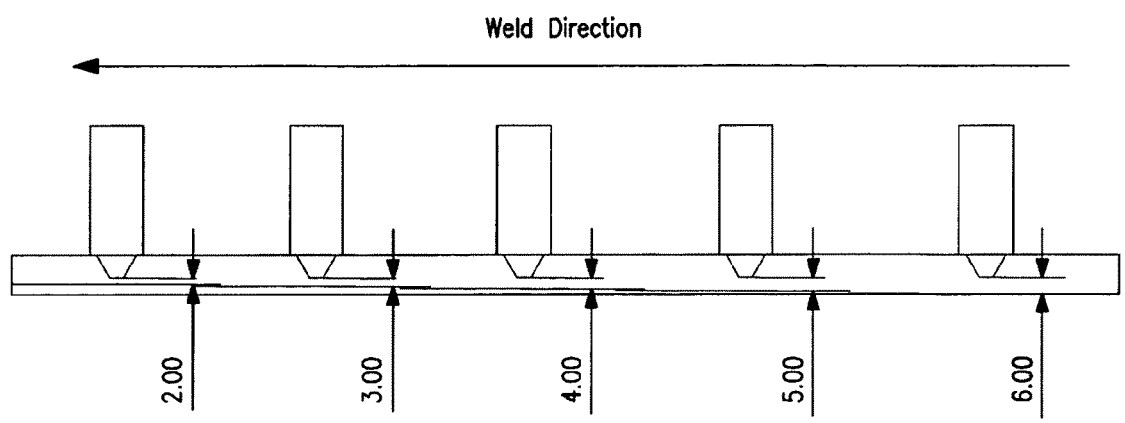

The experimental technique described above may be used to determine critical root area dimensions for a given set of materials and welding conditions by applying FSW to structural steel plate samples with pre-machined thicknesses in the root area. The underside of either a solid plate or two butted plates may be machined to create different root area thicknesses underneath the FSW stir zone as illustrated in FIG. 14. FIG. 14(a) shows a structural steel plate with a stair-step channel pattern machined into the bottom side to vary the thickness of material that is present underneath the FSW tool. FIG. 14(b) is a side view of the plate and a FSW tool is shown at several positions along the plate to demonstrate the variation in material thickness (dimension $T_2$) between the tool and the bottom of the plate. During the FSW operation, as the tool moves along the plate, the stair-step configuration on the bottom provides a continuously decreasing amount of root area and weakened zone thickness for evaluation relative to dropout.

Numerical Modeling Methods for Determining Root Area:

Numerical models may also be used to determine a range of acceptable root area thicknesses for the butt welds and methods of making disclosed herein. These models require knowledge or estimation of material strength within the weakened zone. Since material strength depends primarily on temperature (and strain for the material significantly strained by the FSW process), knowledge or estimation of the thermal and strain cycles in the weakened zone may be inputs to the models. This information may be obtained by using numerical models based on phenomenological laws. These numerical models can be divided into two groups based on their complexity with one group being simplified analytical models and the second being advanced analytical models.

Using simplified analytical models, the temperature beneath the tool may first be estimated using heat conduction equations. The temperature distribution may then be used to calculate material strength during the FSW process. Finally, a simplified deflection calculation may be performed by prescribing the tool pressure in the weakened zone. Hence, the deflection may provide a good estimate of the drop-out size. Based on the calculated drop-out size, a root weld bead size may be prescribed and the above exercise repeated to calculate the drop-out. This process may be repeated until the drop-out size reaches an acceptable value and final guideline on root weld size and dimension $T_2$ are determined.

Using advanced analytical models, the temperature and strain histories required to compute material strength during the FSW process may be calculated using a complex phenomenological model. This degree of modeling considers the material deformation and the heat generation by friction and plasticization of the material near the tool. These models can simulate the FSW process as a coupled to thermo-mechanical problem or as a decoupled problem whereby the thermal and mechanical calculations are considered separately. Using this modeling approach, a root weld bead is placed at the weld joint line on the inner side of the pipe. Then the thermo-mechanical calculations are performed to estimate the drop-out size for the prescribed conditions. As with the previous approach, numerous iterations may be conducted to determine the relation between root bead size, weakened zone size, and dropout.

Experimental-Numerical Combined Approach for Determining Root Area:

A combination of experimental and numerical approaches may be used to determine the dimensions of the fusion root weld area in order to achieve sufficient root area strength to prevent dropout during FSW. A number of assumptions may be necessary in using the numerical approach described above. For example, estimates of material strength and temperature may be necessary. In a combined approach, a limited number of experiments can be conducted to provide either direct inputs to the models or calibration of the numerical approach. For example, experimental results may be made from thermocouple measurements of temperature during the FSW process. Another example may be conducting experiments in a Gleeble or Gleeble-like machine to measure strength properties at elevated temperatures. The Gleeble is capable of conducting elevated tensile tests at pre-described values of applied strain and hence, experimental welds may be pre-instrumented with thermocouples positioned at a variety of locations. Using the experimental information, numerical models may be better calibrated to predict the optimal weakened zone size and root bead dimensions. These numerical models may be in the form of one or more of the following: analytical equations, regression equations, or complex phenomenological models manipulated as a neural network.

Applications:

In one aspect, the butt welds and methods of making disclosed herein are useful in welding cast irons and carbon steel components used in structural applications. In another aspect, the butt welds and methods of making disclosed herein are useful in welding structural steels. These structural steels may be linepipe steels used in the oil and gas industry, including, but not limited to, API (American Petroleum Institute) Pipe Specification 5L pipe grades chosen from X50, X52, X60, X65, X70, X80, X90, X100 and X120 or higher strength steel. The wall thickness of the pipe may range from 3.2 mm to 38.1 mm, or 6.4 mm to 31.8 mm, or 12.7 to 25.4 mm, or 25.5 to 50 mm.

In yet another aspect, the butt welds and methods of making disclosed herein are particularly useful in welding plain carbon and alloy steels. Exemplary, but not limiting, plain carbon and alloy steels include, AISI 1010, 1020, 1040, 1080, 1095, A36, A516, A440, A633, A656, 4063, 4340, 6150 and other AISI grades, including high strength grades. Other exemplary carbon low alloy steels include ASTM grades A285, A387, A515, A516, A517 and other ASTM grades of carbon low alloy steels. Other API structural steel grades such as 2H, 2Y, or similar, in addition to British Standards grades such as 4360-type plates, and similar, provide additional examples of non-limiting exemplary base materials.

The butt welds and methods of making disclosed herein may be used to join structures and structural steel components associated with the oil and gas industry. The methods of making may be performed either in a manufacturing facility such as a fabrication shop or steel mill where the components are made or in the field of fabrication where the components (such as pipelines) are assembled.

The methods of making butt welds disclosed herein are suitable for forming structures in oil and gas exploration, production and refining applications, such as forming butt welds of tubular structural steel components in these types of applications.

Exemplary, but non-limiting, steel structures in the oil and gas exploration, production, refining industry where the methods of making butt welds disclosed herein find application are pipeline weld areas, steel catenary risers (SCR) and top tensioned risers (TTR) weld areas, threaded components, oil drilling equipment weld areas (i.e. two sections of a deep water oil drill string), liquefied natural gas (LNG) and pressurized LNG (PLNG) container weld areas, riser/casing joints, and well head equipment.

In oil and gas upstream applications, the methods of making butt welds disclosed herein are suitable for joining and repairing structures and components used in natural gas transportation and storage type applications. In particular, the methods of making butt welds disclosed herein may be utilized to enable gas transportation technologies ranging from pipelines, compressed natural gas (CNG), pressurized liquefied natural gas (PLNG), liquefied natural gas (LNG) and other storage/transportation technologies. In one form in natural gas transportation and storage type applications, the methods of making butt welds disclosed herein may be used for the joining/processing of pipelines, flow lines, gathering lines, expansion loops, and other transmission lines. This would include severe applications including clad pipes, or Ni-base alloy pipes, 13 Cr pipes, Duplex stainless steel pipes, super duplex stainless steel pipes or pipes made from 36% Ni alloy (also known as Invar) or similar alloys useful for low coefficient of thermal expansion (CTE). In another form in natural gas transportation and storage type applications, the methods of making butt welds disclosed herein may be used for joining/processing of materials made of carbon steels, and structural steels. In yet another form in natural gas transportation and storage type applications, the methods of making butt welds disclosed herein may be used for the joining/processing of LNG, CNG, and PLNG storage and/or transportation structures. This includes modular LNG structures, shipping vessels, transferring components and pipelines, and related technologies.

In another application of the disclosed combined fusion welding and FSW processes, the longitudinal seam weld of a large diameter pipe may be produced using this novel technology. Either spiral, UOE or roll bend pipes can be manufactured using the disclosed welding method. In the case of 36% Ni pipes (also known as Invar), or similar low CTE alloys, this technology may be particularly useful due to the avoidance of typical welding problems such as solidification cracking, ductility dip cracking, and under strength welds due to coarse grains.

In oil and gas exploration and production applications, the methods of making butt welds disclosed herein also may be utilized for joining various structures used for oil and gas well completion and production. These structures include, but are not limited to, offshore and onshore production structures, oil pipelines, oil storage tanks, casing/tubing, completion and production components, cast structure to flow line connections, subsea components, downhole tubular products (e.g. OCTG), topsides and related structures, umbilicals, tender and supply vessels; and flare towers. More particularly, exemplary offshore production structures include jacketed platforms, mobile offshore drilling units and related production components like casings, tendons, risers, and subsea facilities. Mobile offshore drilling units include, but are not limited to, semi-submersibles and jack-up rigs, tension leg platforms (TLPs), deep draft caisson vessels (DDCVs), compliant towers, floating production, storage and offloading (FPSO) vessels, floating storage and offloading (FSO) vessels, ships, tankers and the like. Exemplary subsea components include, but are not limited to, manifold systems, trees, and BOPs. Exemplary topsides and related structures include deck superstructures, drilling rigs, living quarters, helidecks, and related structures.

In downstream applications, the methods of making butt welds disclosed herein are suitable for joining structures and components used in refining and chemical plants. The butt welds and methods of making such butt welds disclosed herein provide advantages in the refining and chemicals plant applications through, inter alia, dissimilar metal joining, joining of steel structures and joining of difficult to weld materials, such as cast iron. These applications include, but are not limited to, cast iron, heat exchanger tubes and low and high-temperature process and pressure vessels. Exemplary low and high-temperature process and pressure vessels include steam cracker tubes, steam reforming tubes, and refinery structures and components. Exemplary materials suitable for the disclosed butt weld include such corrosion resistant materials as 13% Cr steel grades, duplex stainless steel and superduplex stainless steel.

The following are examples of the present disclosure and are not to be construed as limiting with respect to the scope of the invention or the scope of the claims.

EXAMPLES

The following examples further illustrate the butt welds disclosed herein and methods of making such butt welds.

Example 1

Experimental Technique

Figure 15:
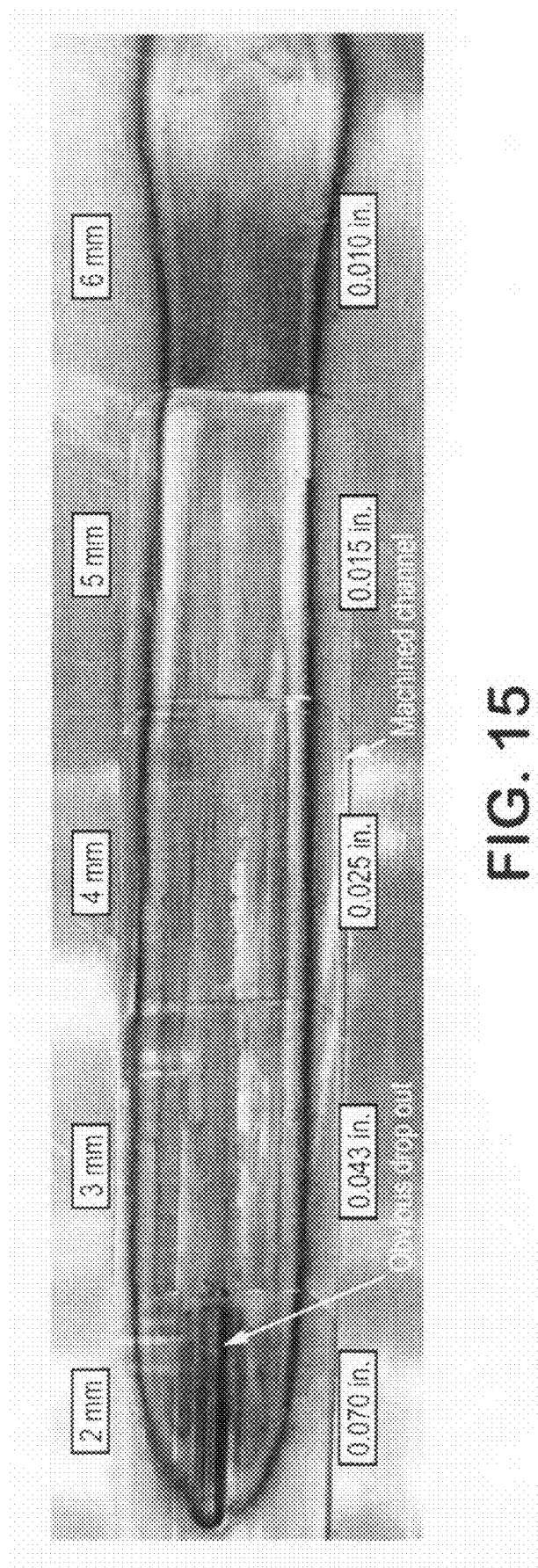
FIG. 15 depicts a photograph taken of a dropout experiment plate bottom showing five different areas of varying plate thickness (noted) where at the thinnest region of the channel, there is large dropout, and the numbers shown in text boxes denote the measured dropout in inches.

Using the experimental technique described for FIG. 14, a channeled bottomed plate was prepared with five zones of varying thickness. After friction stir welding and NDE inspection, dropout was measured and correlated to suitable friction stir weld quality and minimum acceptable weakened zone thickness. FIG. 15 is a photograph of the plate bottom showing five different areas of varying plate thickness and the corresponding dropout measured along the plate. The structural steel plate thickness along the length associated with the channeled bottom ranges from 2 mm to 6 mm (2, 3, 4, 5 and 6 mm), and the corresponding dropout ranges from 0.010 inch to 0.070 inch (values in text boxes of 0.070, 0.043, 0.025, 0.015 and 0.010 inches) with thinner plate thickness values corresponding to less dropout. The inverse relationship between plate thickness and dropout may be seen from FIG. 15. The amount of dropout decreased with increasing thickness $T_2$. This experimental technique provides a simulation of the previously mentioned experiment using actual fusion root welds.

The experimental results shown in FIG. 15 may be used to set root weld thickness values (thus weakened zone thickness values) for subsequent large diameter pipe welding or other structural steel or pipe welding. It was found that when the dimension $T_2$ was less than about two to three millimeters, the amount of dropout was notable and the weld contained defects. When the dimension $T_2$ was closer to about five or six millimeters, dropout was much reduced, and the welds tended to be fully consolidated and defect free. It was, therefore, determined that for the materials and FSW parameters used, $T_2$ needed to be on the order of about four to six millimeters. Changes in materials, FSW parameters, or weld geometry could result in different acceptable $T_2$ thicknesses, but the general methodology described can be used to determine weakened zone thickness and root weld size for any combination of variables.

Applicants have attempted to disclose all forms and applications of the disclosed subject matter that could be reasonably foreseen. However, there may be unforeseeable, insubstantial modifications that remain as equivalents. While the present disclosure has been described in conjunction with specific, exemplary forms thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. All numerical values within the detailed description and the claims herein are also understood as modified by "about."

What is claimed is:

1. A butt weld comprising:
   two or more abutting structural steel components beveled on faying surfaces on one side of the components to form a suitably shaped fusion root weld groove and unbeveled on faying surfaces on the opposite side of the components and interconnected with a first fusion root weld on the beveled side of the components and a second friction stir weld on the unbeveled side of the components,
   wherein the first fusion root weld has a width ranging from 7 mm to 30 mm, a penetration depth ranging from 2 mm to 20 mm, and an overfill ranging from 2 mm to 5 mm, and
   wherein the stir zone of the second friction stir weld penetrates the first fusion root weld.

2. The butt weld of claim 1, wherein the first fusion root weld has a width ranging from 7 mm to 20 mm.

3. The butt weld of claim 2, wherein the first fusion root weld has a width ranging from 7 mm to 15 mm.

4. The butt weld of claim 1, wherein the first fusion root weld has a penetration depth ranging from 4 mm to 15 mm.

5. The butt weld of claim 4, wherein the first fusion root weld has a penetration depth ranging from 5 mm to 10 mm.

6. The butt weld of claim 1, wherein the first fusion root weld has an overfill ranging from 2.5 mm to 4 mm.

7. The butt weld of claim 1, wherein the stir zone of the second friction stir weld penetrates the fusion root weld to a depth ranging from essentially zero mm to 5 mm.

8. The butt weld of claim 7, wherein the stir zone of the second friction stir weld penetrates the first fusion root weld to a depth ranging from 0.5 mm to 3 mm.

9. The butt weld of claim 1, wherein the suitably shaped fusion root weld groove is chosen from u-shaped bevels, j-shaped bevels, v-shaped bevels, and combinations thereof.

10. The butt weld of claim 9, wherein the suitably shaped fusion root weld groove ranges from 2 mm to 15 mm in width and depth.

11. The butt weld of claim 10, wherein the suitably shaped fusion root weld groove ranges from 3 mm to 10 mm in width and depth.

12. The butt weld of claim 1, wherein the two or more structural steel components are API (American Petroleum Institute) Pipe Specification 5L pipe grades chosen from X50, X52, X60, X65, X70, X80, X90, X100 and X120.

13. The butt weld of claim 1, wherein the two or more structural steel components are plain carbon and alloy steels chosen from AISI grades 1010, 1020, 1040, 1080, 1095, A36, A516, A440, A633, A656, 4063, 4340, 6150, and ASTM grades A285, A387, A515, A516, A517.

14. The butt weld of claim 1, wherein the two or more structural steel components are structural steel grades chosen from API grade 2H, API grade 2Y, and British Standards grade 4360.

15. The butt weld of claim 1, wherein the two or more structural steel components are chosen from clad pipes, spiral pipes, UOE pipes, roll bend pipes, Ni-base alloy pipes, 13 Cr pipes, duplex stainless steel pipes, super duplex stainless steel pipes, 36% Ni alloy pipes and pipes made from other low coefficient of thermal expansion alloys.

16. The butt weld of claim 1, wherein the two or more structural steel components include alloying elements chosen from W, Ta, Nb, Mo, V, Cr and combinations thereof.

17. The butt weld of claim 1, wherein the first fusion root weld is formed by controlling fusion welding process conditions including one or more of: chemistry of the weld wire, arc voltage, arc current magnitude, arc current waveform, travel speed of the welding torch, weld wire feed rate, shielding gas composition, flux composition, and cooling rate of the first fusion root weld.

18. The butt weld of claim 17, wherein the chemistry of the weld wire includes a ferrous chemistry with alloying elements chosen from W, Ta, Nb, Mo, V, Cr and combinations thereof.

19. The butt weld of claim 1, wherein the second friction stir weld is formed by controlling friction stir welding process conditions including one or more of: geometry of the friction stir weld tool, welding travel speed of the friction stir weld tool, rotational speed of the friction stir weld tool, torsion loads applied to the friction stir weld tool, the down force load or the translational load on the friction stir weld tool, the cooling rate of the second friction stir weld, and the simultaneous cooling of the first fusion root weld as the friction stir process is being applied.

20. The butt weld of claim 19, wherein the down force load or the translational load on the friction stir weld tool is sufficiently low to prevent the dropout of the first fusion root weld during formation of the second friction stir weld and sufficiently high to prevent defects in the second friction stir weld.

21. The butt weld of claim 20, wherein the down force load or the translational load on the friction stir weld tool ranges from greater than or equal to 1000 $lb_f$ to less than or equal to 30,000 $lb_f$.

22. The butt weld of claim 19, wherein the torsion load applied to the friction stir weld tool ranges from greater than or equal to 150 ft-lb to less than or equal to 1000 ft-lb.

23. The butt weld of claim 22, wherein the torsion load applied to the friction stir weld tool ranges from greater than or equal to 200 ft-lb to less than or equal to 750 ft-lb.

24. The butt weld of the claim 1, wherein the first fusion root weld is of sufficient strength and toughness to prevent the dropout of the first fusion root weld during formation of the second friction stir weld.

25. The butt weld of claim 1, wherein the first fusion root weld is formed by fusion welding processes chosen from shielded metal arc welding, gas metal arc welding, flux cored arc welding, metal core arc welding, gas tungsten arc welding, plasma arc welding, submerged arc welding, laser welding, laser-hybrid welding, electron beam welding, flash butt welding, homopolar welding, and combinations thereof.

26. The butt weld of claim 1, wherein the second friction stir weld is formed while applying a mechanical backing support to the first fusion root weld side of the components.

27. The butt weld of claim 26, wherein the mechanical backing support is a secondary mandrel or anvil that conforms to the geometry of the first fusion root weld area.

28. The butt weld of claim 27, wherein the secondary mandrel or anvil conforms to the geometry of the first fusion root weld area via material compliance, mechanical compliance, or combinations thereof.

29. The butt weld of claim 28, wherein the material compliance includes segmented pieces supported by a flexible layer expandable by either hydraulic or mechanical means.

30. A method of making a butt weld comprising:
providing two or more abutting structural steel components beveled on the faying surfaces of one side of the components to form a suitably shaped fusion root weld groove and unbeveled on the faying surfaces of the opposite side of the components,
fusion welding the beveled faying surfaces of one side of the components under conditions sufficient to form a fusion root weld, wherein the fusion root weld has a width ranging from 7 mm to 30 mm, a penetration depth ranging from 2 mm to 20 mm, and an overfill ranging from 2 mm to 5 mm, and
friction stir welding the unbeveled faying surfaces of the opposite side of the components under conditions sufficient to form a friction stir weld, wherein the stir zone of the friction stir weld penetrates the fusion root weld to a depth ranging from essentially zero mm to 5 mm.

31. The method of claim 30, wherein the fusion root weld has a width ranging from 7 mm to 20 mm.

32. The method of claim 30, wherein the fusion root weld has a width ranging from 7 mm to 15 mm.

33. The method of claim 30, wherein the fusion root weld has a penetration depth ranging from 4 mm to 15 mm.

34. The method of claim 33, wherein the fusion root weld has a penetration depth ranging from 5 mm to 10 mm.

35. The method of claim 30, wherein the fusion root weld has an overfill ranging from 2.5 mm to 4 mm.

36. The method of claim 30, wherein the stir zone of the friction stir weld penetrates the first fusion root weld to a depth ranging from 0.5 mm to 3 mm.

37. The method of claim 30, wherein the suitably shaped fusion root weld groove is chosen from u-shaped bevels, j-shaped bevels, v-shaped bevels, and combinations thereof.

38. The method of claim 37, wherein the suitably shaped fusion root weld groove ranges from 2 mm to 15 mm in width and depth.

39. The method of claim 38, wherein the suitably shaped fusion weld groove ranges from 3 mm to 10 mm in width and depth.

40. The method of claim 30, wherein the two or more structural steel components are API (American Petroleum Institute) Pipe Specification 5L pipe grades chosen from X50, X52, X60, X65, X70, X80, X90, X100 and X120.

41. The method of claim 30, wherein the two or more structural steel components are plain carbon and alloy steels chosen from AISI grades 1010, 1020, 1040, 1080, 1095, A36, A516, A440, A633, A656, 4063, 4340, 6150; ASTM grades A285, A387, A515, A516, A517; API grades 2H, 2Y; and British Standards grade 4360.

42. The method of claim 30, wherein the two or more structural steel components are chosen from clad pipes, spiral pipes, UOE pipes, roll bend pipes, Ni-base alloy pipes, 13 Cr pipes, duplex stainless steel pipes, super duplex stainless steel pipes, 36% Ni alloy pipes and pipes made from other low coefficient of thermal expansion alloys.

43. The method of claim 30, wherein the two or more structural steel components include alloying elements chosen from W, Ta, Nb, Mo, V, Cr and combinations thereof.

44. The method of claim 30, wherein the conditions sufficient to form the fusion root weld are chosen from at least one of the chemistry of the weld wire, the arc voltage, the arc current magnitude, the arc current waveform, the weld wire feed rate, the travel speed of the welding torch, the shielding gas composition, the flux composition, and the cooling rate of the fusion root weld.

45. The method of claim 44, wherein the chemistry of the weld wire includes a ferrous chemistry with alloying elements chosen from W, Ta, Nb, Mo, V, Cr and combinations thereof.

46. The method of claim 44, wherein the cooling rate of the fusion root weld ranges from 10 to 200° C./sec.

47. The method of claim 30, wherein the friction stir weld is formed by controlling friction stir welding process conditions including one or more of: geometry and size of the friction stir weld tool, welding travel speed of the friction stir weld tool, rotational speed of the friction stir weld tool, the down force load or the translational load on the friction stir weld tool, the cooling rate of the friction stir weld, and the simultaneous cooling rate of the fusion root weld.

48. The method of claim 47, wherein the geometry of the friction stir weld tool includes shapes, ridges or patterns machined, molded, or manufactured into the tool pin to improve material flow, increase depth of penetration, increase weld travel speed, and/or decrease welding defects.

49. The method of claim 47, wherein the welding travel speed of the friction stir weld tool ranges from 1 to 30 inches per minute.

50. The method of claim 47, wherein the rotational speed of the friction stir weld tool ranges from 100 to 700 rpms.

51. The method of claim 47, wherein the down force load or the translational load on the friction stir weld tool is sufficiently low to prevent the dropout of the fusion root weld during formation of the friction stir weld and sufficiently high to prevent defects in the friction stir weld.

52. The method of claim 51, wherein the down force load or the translational load on the friction stir weld tool is greater than or equal to 1000 $lb_f$ and less than or equal to 30,000 $lb_f$.

53. The method of claim 47, wherein the cooling rate of the friction stir weld ranges from 10° C. per second to 400° C. per second.

54. The method of claim 47, wherein the simultaneous cooling rate of the fusion root weld ranges from 10° C. per second to 200° C. per second.

55. The method of claim 30, wherein friction stir weld is formed by an orbital friction stir welding system.

56. The method of claim 30, wherein the fusion root weld is of sufficient strength and toughness to prevent the dropout of the fusion root weld during friction stir welding.

57. The method of claims 44 or 47, wherein the method to cool the fusion root weld during the application of friction stir welding is through forced fluid cooling with a gaseous or liquid medium.

58. The method of claims 57, wherein the gaseous or liquid medium is chosen from water, glycol, carbon dioxide, nitrogen, and combinations thereof.

59. The method of claim 30, wherein the fusion welding process is chosen from shielded metal arc welding, gas metal arc welding, flux cored arc welding, metal core arc welding, gas tungsten arc welding, plasma arc welding, submerged arc welding, laser welding, laser-hybrid welding, electron beam welding, flash butt welding, homopolar welding, and combinations thereof.

60. The method of claim 30, further including applying a mechanical backing support to the first fusion root weld side of the components during friction stir welding.

61. The method of claim 60, wherein the mechanical backing support is a secondary mandrel or anvil that conforms to the geometry of the first fusion root weld area.

62. The method of claim 61, wherein the secondary mandrel or anvil conforms to the geometry of the first fusion root weld area via material compliance, mechanical compliance, or combinations thereof.

63. The method of claim 62, wherein the material compliance includes segmented pieces supported by a flexible layer expandable by either hydraulic or mechanical means.

64. A butt weld comprising:
two or more abutting structural steel components beveled on faying surfaces on one side of the components to form a suitably shaped fusion root weld groove and unbeveled on faying surfaces on the opposite side of the components and interconnected with a first fusion root weld on the beveled side of the components and a second friction stir weld on the unbeveled side of the components,
wherein the first fusion root weld is of sufficient size to support the down force applied in forming the second friction stir weld, and
wherein the stir zone of the second friction stir weld penetrates the first fusion root weld to a sufficient depth to provide a continuously joined surface.

65. The butt weld of claim 64, wherein the first fusion root weld has a width ranging from 7 mm to 20 mm.

66. The butt weld of claim 64, wherein the first fusion root weld has a width ranging from 7 mm to 15 mm.

67. The butt weld of claim 64, wherein the first fusion root weld has a penetration depth ranging from 4 mm to 15 mm.

68. The butt weld of claim 67, wherein the first fusion root weld has a penetration depth ranging from 5 mm to 10 mm.

69. The butt weld of claim 64, wherein the first fusion root weld has an overfill ranging from 2.5 mm to 4 mm.

70. The butt weld of claim 64, wherein the stir zone of the second friction stir weld penetrates the first fusion root weld to a depth ranging from essentially zero mm to 5 mm.

71. The butt weld of claim 70, wherein the stir zone of the second friction stir weld penetrates the first fusion root weld to a depth ranging from 0.5 mm to 3 mm.

72. The butt weld of claim 64, wherein the suitably shaped fusion root weld groove is chosen from u-shaped bevels, j-shaped bevels, v-shaped bevels, and combinations thereof.

73. The butt weld of claim 72, wherein the suitably shaped fusion root weld groove ranges from 2 mm to 15 mm in width and depth.

74. The butt weld of claim 64, wherein the two or more structural steel components are API (American Petroleum Institute) Pipe Specification 5L pipe grades chosen from X50, X52, X60, X65, X70, X80, X90, X100 and X120.

75. The butt weld of claim 64, wherein the two or more structural steel components are plain carbon and alloy steels chosen from AISI grades 1010, 1020, 1040, 1080, 1095, A36, A516, A440, A633, A656, 4063, 4340, 6150; ASTM grades A285, A387, A515, A516, A517; API grades 2H, 2Y; and British Standards grade 4360.

76. The butt weld of claim 64, wherein the two or more structural steel components are chosen from clad pipes, spiral pipes, UOE pipes, roll bend pipes, Ni-base alloy pipes, 13 Cr pipes, duplex stainless steel pipes, super duplex stainless steel pipes, 36% Ni alloy pipes and pipes made from other low coefficient of thermal expansion alloys.

77. The butt weld of claim 64, wherein the two or more structural steel components include alloying elements chosen from W, Ta, Nb, Mo, V, Cr and combinations thereof.

78. The butt weld of the claim 64, wherein the first fusion root weld is of sufficient strength and toughness to prevent the dropout of the first fusion root weld during formation of the second friction stir weld.

79. The butt weld of claim 64, wherein the first fusion root weld is formed by fusion welding processes chosen from shielded metal arc welding, gas metal arc welding, flux cored arc welding, metal core arc welding, gas tungsten arc welding, plasma arc welding, submerged arc welding, laser welding, laser-hybrid welding, electron beam welding, flash butt welding, homopolar welding, and combinations thereof.

80. The butt weld of claim 64, wherein the second friction stir weld is formed while applying a mechanical backing support to the first fusion root weld side of the components.

81. The butt weld of claim 80, wherein the mechanical backing support is a secondary mandrel or anvil that conforms to the geometry of the first fusion root weld area.

82. The butt weld of claim 81, wherein the secondary mandrel or anvil conforms to the geometry of the first fusion root weld area via material compliance, mechanical compliance, or combinations thereof.

83. The butt weld of claim 82, wherein the material compliance includes segmented pieces supported by a flexible layer expandable by either hydraulic or mechanical means.

* * * * *